US012629552B2

(12) United States Patent
Shields et al.

(10) Patent No.: US 12,629,552 B2
(45) Date of Patent: May 19, 2026

(54) SPRINKLER ASSEMBLY WITH CAP AND COVER

(71) Applicant: Tyco Fire Products LP, Lansdale, PA (US)

(72) Inventors: Steven Lee Shields, Lubbock, TX (US); Manuel R. Silva, Jr., Cranston, RI (US); Sean E. Cutting, West Warwick, RI (US); William K. Rucker, Lubbock, TX (US); Daniel A. Cross, South Kingston, RI (US)

(73) Assignee: Tyco Fire Products LP, Cranston, RI (US)

( * ) Notice: Subject to any disclaimer, the term of this patent is extended or adjusted under 35 U.S.C. 154(b) by 192 days.

(21) Appl. No.: 17/839,986

(22) Filed: Jun. 14, 2022

(65) Prior Publication Data

US 2022/0305313 A1 Sep. 29, 2022

Related U.S. Application Data

(63) Continuation of application No. 17/165,009, filed on Feb. 2, 2021, now Pat. No. 11,389,682, which is a continuation of application No. 16/589,798, filed on Oct. 1, 2019, now Pat. No. 11,389,681.

(60) Provisional application No. 62/740,243, filed on Oct. 2, 2018, provisional application No. 62/740,268, filed on Oct. 2, 2018, provisional application No. 62/740,247, filed on Oct. 2, 2018.

(51) Int. Cl.
*A62C 37/08* (2006.01)
*A62C 35/68* (2006.01)
*A62C 37/12* (2006.01)
*B05B 1/30* (2006.01)
*B05B 3/04* (2006.01)

(52) U.S. Cl.
CPC .............. *A62C 37/08* (2013.01); *A62C 35/68* (2013.01); *A62C 37/12* (2013.01); *B05B 1/30* (2013.01); *B05B 3/0426* (2025.08)

(58) Field of Classification Search
CPC ............. F16B 23/0061; B25B 13/5008; B25B 13/5091; B25B 13/06; B25B 13/02; A62C 35/68; A62C 37/12; A62C 37/08; B05B 1/26–267
See application file for complete search history.

(56) References Cited

U.S. PATENT DOCUMENTS 2,180,633 A * 11/1939 Holt .................... F16B 23/0061 411/405
3,010,521 A 11/1961 Seaberg
3,061,016 A 10/1962 Hodman
(Continued)

*Primary Examiner* — Tuongminh N Pham
(74) *Attorney, Agent, or Firm* — Foley & Lardner LLP

(57) ABSTRACT

A sprinkler assembly includes a body defining an inlet, an outlet, and a fluid passage extending along a longitudinal axis between the inlet and the outlet. A guide pin aperture is defined by at least one of the body or a bushing coupled to the body. The sprinkler assembly further includes a deflector slidably coupled to the body. The deflector includes a deflector body coupled to a guide pin. The guide pin includes a shaft portion extending through the guide pin aperture and a shoulder that is wider than the shaft portion and configured to engage at least one of the body or the bushing to limit movement of the deflector body away from the body.

19 Claims, 25 Drawing Sheets

(56) References Cited

U.S. PATENT DOCUMENTS

| | | | | |
|---|---|---|---|---|
| 5,213,016 | A * | 5/1993 | Kah, Jr. | B05B 3/0431 81/125 |
| 5,670,997 | A | 9/1997 | Sugimoto et al. | |
| 6,077,267 | A * | 6/2000 | Huene | F16B 23/0061 606/77 |
| 6,840,329 | B2 | 1/2005 | Kikuchi et al. | |
| 6,962,208 | B2 | 11/2005 | Franson et al. | |
| 7,021,392 | B2 | 4/2006 | Bentzien et al. | |
| 7,275,603 | B2 | 10/2007 | Polan | |
| 8,151,897 | B1 | 4/2012 | Meyer et al. | |
| 11,484,739 | B2 | 11/2022 | Thompson | |
| 11,660,482 | B2 | 5/2023 | Shields | |
| 2004/0134670 | A1 | 7/2004 | Orr et al. | |
| 2006/0201286 | A1 * | 9/2006 | Ide | B25B 13/06 81/124.2 |
| 2008/0083305 | A1 * | 4/2008 | Miley | B25B 13/02 81/437 |
| 2009/0244579 | A1 | 10/2009 | Inoue | |
| 2010/0263883 | A1 * | 10/2010 | Abels | A62C 31/02 169/37 |
| 2011/0036598 | A1 | 2/2011 | Pahila | |
| 2013/0014963 | A1 | 1/2013 | Porta | |
| 2013/0306334 | A1 | 11/2013 | Koiwa | |
| 2015/0083442 | A1 | 3/2015 | Koiwa | |
| 2016/0030785 | A1 | 2/2016 | Ringer et al. | |
| 2017/0319884 | A1 | 11/2017 | Oldham | |
| 2021/0205648 | A1 | 7/2021 | Thompson | |

* cited by examiner

SPRINKLER ASSEMBLY WITH CAP AND COVER

CROSS-REFERENCE TO RELATED PATENT APPLICATIONS

This application is a continuation of U.S. patent application Ser. No. 17/165,009, filed Feb. 2, 2021, which is a continuation of U.S. patent application Ser. No. 16/589,798, filed Oct. 1, 2019, which claims the benefit of U.S. Provisional Patent Application Nos. 62/740,243, filed Oct. 2, 2018, 62/740,247, filed Oct. 2, 2018, and 62/740,268, filed Oct. 2, 2018, all of which are incorporated herein by reference in their entireties.

BACKGROUND

Fire suppression sprinkler systems are widely used for fire protection. These systems have sprinklers that are activated in response to an indication that a fire may be nearby (e.g., the ambient temperature in an environment, such as a room or building, exceeds a predetermined value). Once activated, the sprinklers distribute fire-extinguishing fluid, such as water, in the room or building.

SUMMARY

At least one embodiment relates to a sprinkler assembly including a body defining an inlet, an outlet, and a fluid passage extending along a longitudinal axis between the inlet and the outlet. A guide pin aperture is defined by at least one of the body or a bushing coupled to the body. The sprinkler assembly further includes a deflector slidably coupled to the body. The deflector includes a deflector body coupled to a guide pin. The guide pin includes a shaft portion extending through the guide pin aperture and a shoulder that is wider than the shaft portion and configured to engage at least one of the body or the bushing to limit movement of the deflector body away from the body.

Another embodiment relates to a sprinkler assembly including a sprinkler body defining (a) an inlet, an outlet, and a fluid passage extending along a longitudinal axis between the inlet and the outlet and (b) a lug receiving relief. The sprinkler assembly further includes a deflector slidably coupled to the sprinkler body and a protective cap selectively coupled to the sprinkler body. The protective cap includes a cap body defining a recess that receives the sprinkler body and a lug coupled to the cap body and configured to extend into the lug receiving relief to limit rotation of the cap body relative to the sprinkler body.

Another embodiment relates to a protective cap for a sprinkler including a main body and a protrusion coupled to the main body. The main body includes an annular wall extending along a longitudinal axis and an end wall coupled to the annular wall. The annular wall has an inner surface and an outer surface. The annular wall and the end wall define a recess therebetween configured to receive a sprinkler body of the sprinkler. The protrusion extends into the recess and is configured to engage the sprinkler body to limit at least one of (a) longitudinal movement of the protective cap relative to the sprinkler body or (b) rotation of the protective cap relative to the sprinkler body about the longitudinal axis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Fire suppression sprinklers generally include a body with an outlet, an inlet connectable to a source of fire retardant fluid or fire suppressant fluid under pressure, and a deflector supported by the body in a position opposing the outlet for distribution of the fire-extinguishing fluid over a predetermined area to be protected from fire. Individual fire suppression sprinklers may be closed or sealed by a cap. The cap is held in place by a thermally-sensitive element which is released when its temperature is elevated to within a prescribed range, e.g. by the heat from a fire.

Figure 1:
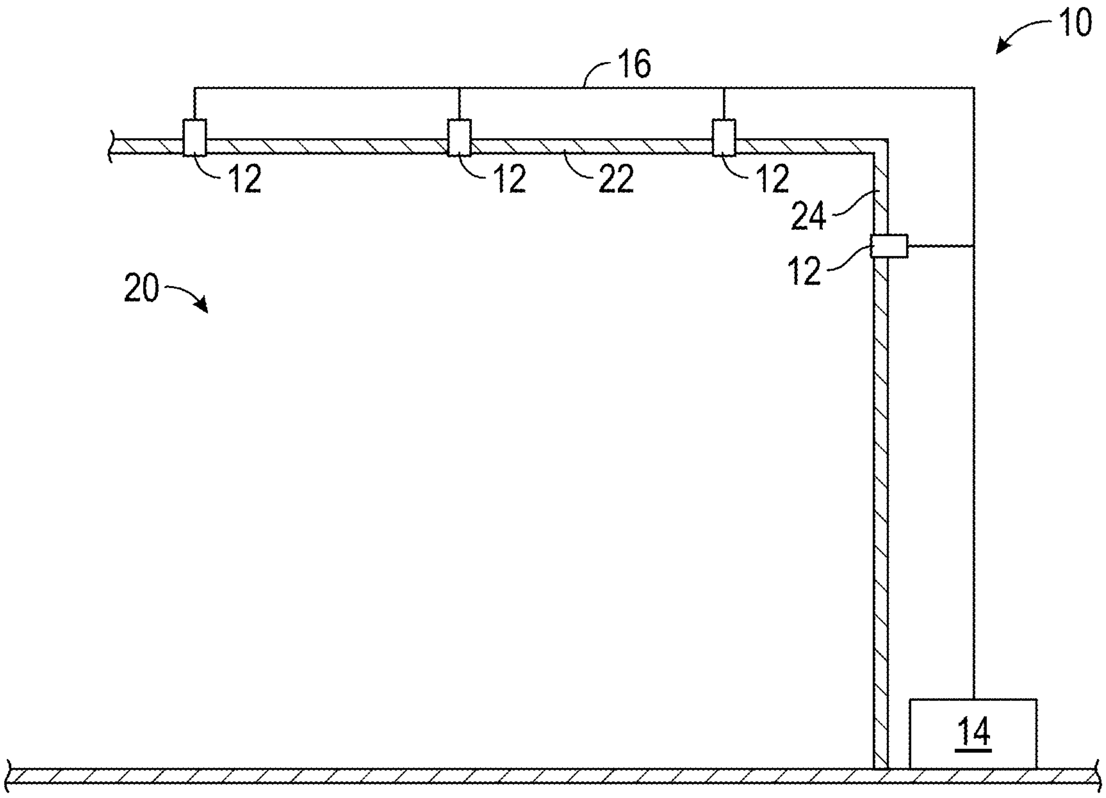
FIG. 1 is a schematic view of a fire suppression system of a building, according to an exemplary embodiment.

Referring to FIG. 1, a fire suppression system 10 of a building is shown according to an exemplary embodiment. The fire suppression system 10 includes a series of sprinklers 12 fluidly coupled to a source 14 of fire suppressant fluid, such as water. The source 14 can include a pump that pressurizes the fire suppressant fluid, a reservoir filled with fire suppressant fluid and positioned atop the building, or another source of pressurized fire suppressant fluid. The sprinklers 12 are fluidly coupled to the source 14 through one or more conduits 16 (e.g., pipes, hoses, etc.). A room 20 of the building can utilize one or more sprinklers 12. In some embodiments, the sprinklers 12 and/or the conduits 16 extend above a ceiling 22 of the room 20 such that the sprinklers 12 and/or the conduits 16 are obscured from view. Additionally or alternatively, the sprinklers 12 may extend into a wall 24 such that the sprinklers 12 and/or conduits 16 are obscured from view. In other embodiments, the sprinklers 12 and/or the conduits 16 are not obscured from view. In the event that a fire occurs within the room 20, the ambient temperature around the sprinklers 12 increases. Once the temperature increases above a threshold temperature, the sprinklers 12 activate, spreading the fire suppressant fluid throughout the room 20 to contain and/or extinguish the fire.

Some fire sprinklers include components made primarily from metal, such as brass. To reduce manufacturing cost, such sprinklers include many relatively simple parts that can be easily produced using common metal forming techniques (e.g., casting, drilling, tapping, stamping, etc.). These components are then assembled together to form the sprinkler assembly.

Figure 2:
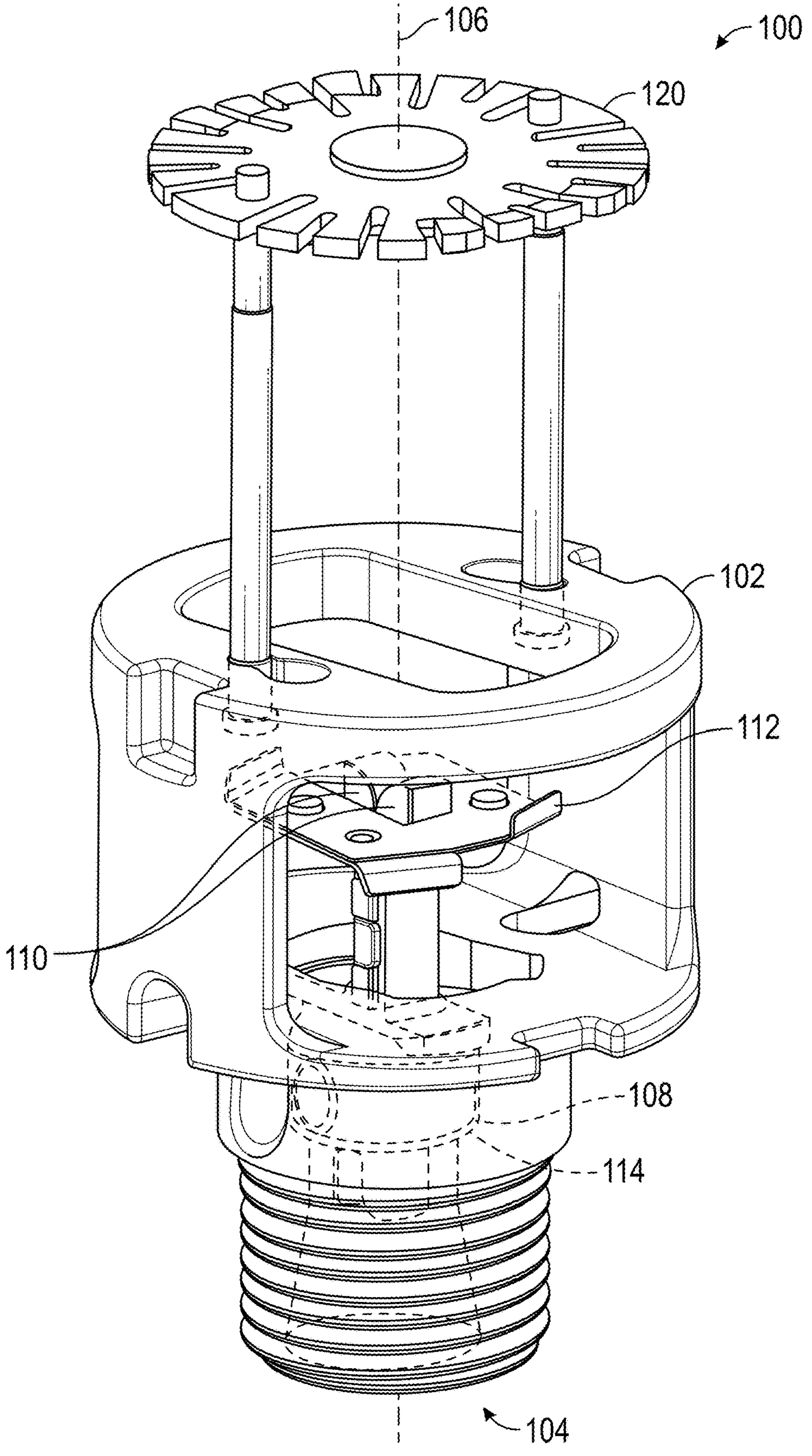
FIG. 2 is a perspective view of a sprinkler, according to an exemplary embodiment.

Referring to FIG. 2, the sprinkler 12 can be a fire sprinkler assembly, shown as sprinkler 100. The sprinkler 100 utilizes multiple components made from a polymeric material. In one embodiment, the polymeric material is glass fiber enforced polyphenylene sulfide (PPS) (e.g., Ryton R-4, Fortron). This material is ideal for a fire sprinkler application, as it is strong, corrosion resistant, and has no known solvents below 200 degrees Celsius. The polymeric material may be injection molded to form each of the components. This material is inherently corrosion resistant, and accordingly is well suited to prolonged contact with water or other types of fire-suppressants. Additionally, because the polymeric material can be injection molded, the components can be made to have a complex geometry quickly, easily, and at a low cost. Because of this, the sprinkler 100 can have a reduced part count relative to a metal sprinkler, reducing the costs and complexity of the assembly process. Injection molding of the components reduces the number of operations and associated pieces of equipment required to manufacture the sprinkler 100, thereby reducing the manufacturing costs and floor space required to manufacture the sprinkler 100.

In other embodiments, a different type of polymeric material is used. By way of example, other suitable polymeric materials may include: polyetheretherketone (PEEK); polyphthalamide (PPA) (e.g., Amodel, Ultramid); polyetherketoneketone (PEKK); polyimide (TPI) (e.g., Vespel); polyamide 6, 66, and 12 (PA6, PA66, and PA12) (e.g., Nylon, Zytel, long fiber Celstran); polysulfone (PSU); polyethersulfone (PES); polyetherimide (PEI) (e.g., Ultem); and polyamide-imide (PAI) (e.g., Torlon). Some such materials may be activated by heat curing after injection molding to further strengthen the components. Any of the polymers discussed herein may be reinforced (e.g., filled) with glass fibers, carbon fibers, aramid fibers, mica fibers, or other types of fibers. In yet other embodiments, some or all of the components are formed using a non-polymeric material such as metal (e.g., brass, stainless steel, etc.).

The sprinkler 100 includes a sprinkler body (e.g., a housing, a frame, etc.), shown as body 102, that defines an aperture, shown as inlet 104, configured to be fluidly coupled to the source 14 (e.g., through the conduit 16). The body 102 further defines an outlet 260 opposite the inlet 104 and selectively fluidly coupled to the inlet 104. The body 102 extends away from the inlet 104 along a longitudinal axis 106. A cap, plug, stopper, brace, or member, shown as button 108, is held in place by a pair of levers, shown as lever arms 110. The lever arms 110 are held against one another by a destructible assembly or activation assembly, shown as fusible link 112. When the sprinkler 100 is fully assembled, the lever arms 110 engage the body 102 and push against the button 108. The button 108 in turn pushes a conical spring seal, shown as spring seal 114, against the body 102. The spring seal 114 seals the inlet 104, fluidly decoupling the inlet 104 and the outlet 260 and preventing the fire suppressant fluid from escaping the sprinkler 100. When a heat source causes the temperature of the fusible link 112 to increase above a threshold temperature, the fusible link 112 comes apart. This permits the lever arms 110 to separate from one another and loosens the button 108 and the spring seal 114. The pressure of the fire suppressant fluid pushes against the button 108 and the spring seal 114, forcing the button 108, the lever arms 110, and the spring seal 114 out of the body 102, and the fire suppressant fluid is released from the sprinkler 100 into the surroundings. The sprinkler 100 further includes a deflector assembly, shown as deflector 120, coupled to the body 102. The deflector 120 is positioned such that the fire suppressant fluid strikes the deflector 120 immediately prior to leaving the sprinkler 100, spreading the fluid over a larger area. In some embodiments, one or more of the body 102, the button 108, and the lever arms 110 are formed from a polymeric material.

In other embodiments, one or more of the lever arms 110 and the fusible link 112 are omitted, and the sprinkler 100 includes a different type of activation element or activation assembly. The activation assembly may include a temperature-sensitive frangible bulb that shatters upon reaching a threshold temperature, activating the sprinkler 100. The activation assembly may include a shape memory alloy that changes shape upon reaching a threshold temperature, activating the sprinkler. The activation assembly may include an electric actuator that is configured to activate the sprinkler. The electric actuator may be coupled to a controller that uses an input from a sensor to determine if a threshold temperature has been reached and subsequently activates the electric actuator.

In FIG. 2, the sprinkler 100 is shown with the deflector 120 positioned above the body 102. It should be understood that the orientations of the components shown herein may be chosen to facilitate showing certain features, and these orientations may not represent the orientations of the components after installation and/or during operation. By way of example, once installed, the deflector 120 may be positioned below or laterally outward from the body 102.

Body

Referring to FIGS. 3-9, the body 102 is shown according to an exemplary embodiment. In this embodiment, the body 102 is injection molded as a single piece from polymeric material. The body 102 includes a first section, shown as neck portion 240. The neck portion extends along and is substantially centered about the longitudinal axis 106. As shown, the neck portion 240 is threaded (e.g., with tapered threads, with NPT threads, etc.) to facilitate sealing engagement with the conduit 16 that provides the sprinkler 100 with a supply of pressurized fire suppressant fluid. In other embodiments, the neck portion 240 is otherwise coupled to the conduit 16 (e.g., through a quick-disconnect fitting, through a fitting having straight threads and a gasket, through a flared fitting, through a grooved coupling, through a compression fitting, etc.).

Figure 6:
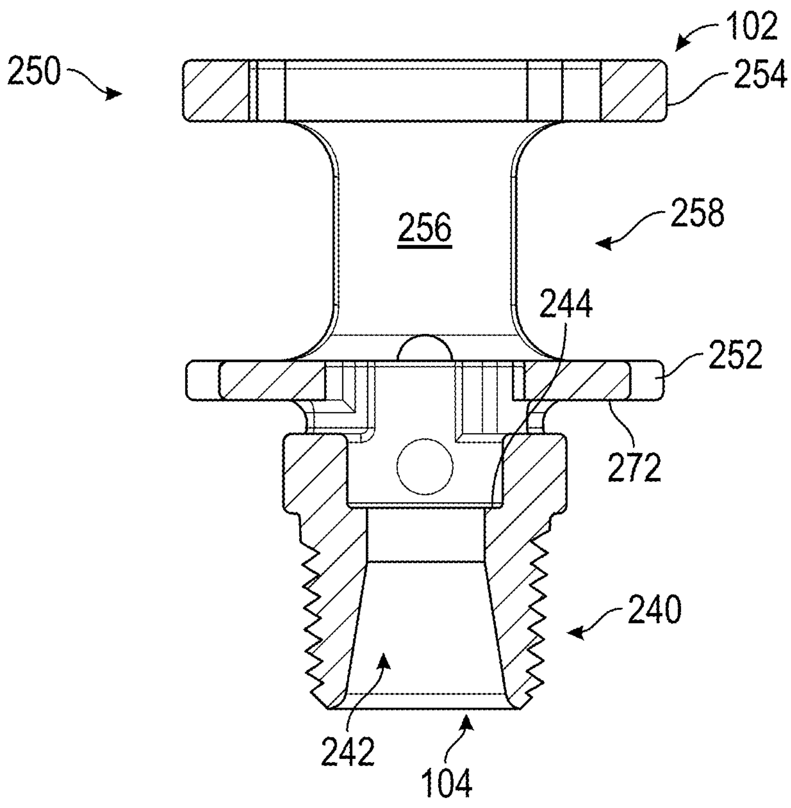
FIG. 6 is a right side section view of the body of FIG. 3.
Figure 7:
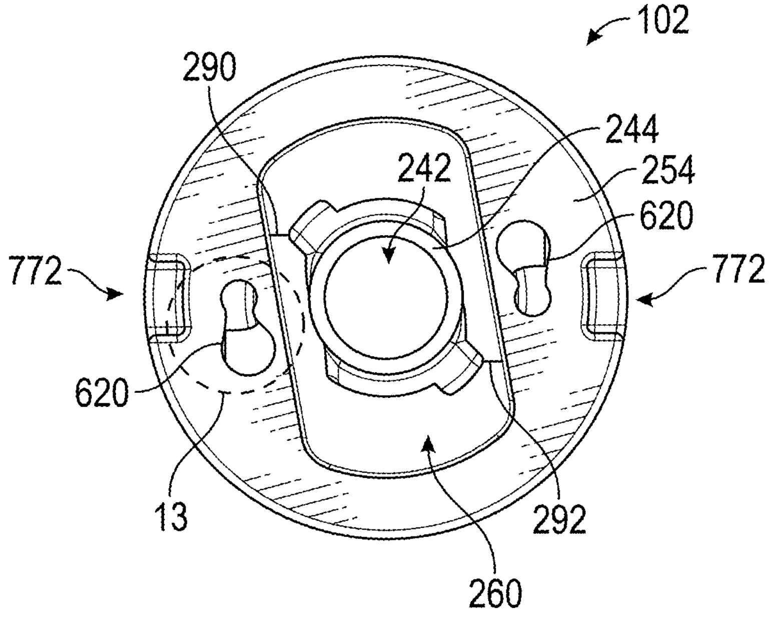
FIG. 7 is a top view of the body of FIG. 3.
Figure 8:
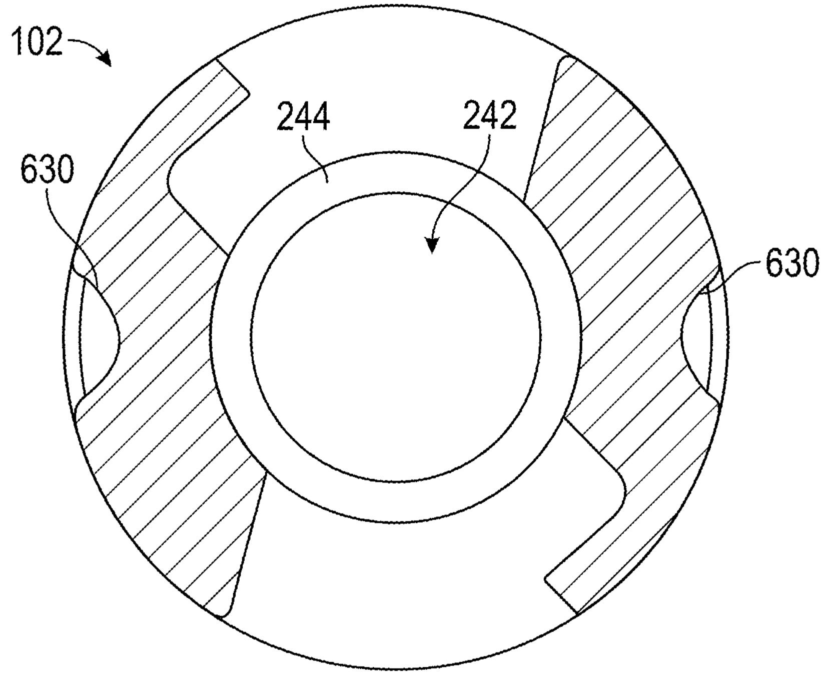
FIG. 8 is a top section view of the body of FIG. 3.
Figure 9:
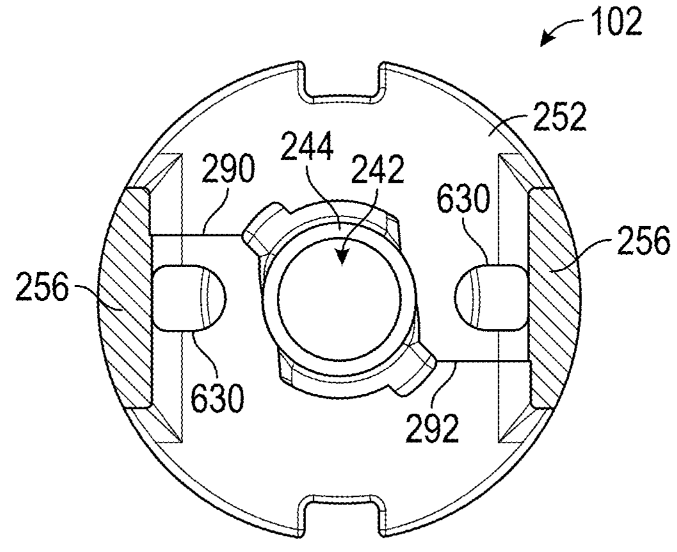
FIG. 9 is another top section view of the body of FIG. 3.

The neck portion 240 defines a passage 242 extending along and centered about the longitudinal axis 106. The passage 242 begins at the inlet 104 and extends toward the opposite end of the body 102. As shown in FIG. 6, the passage 242 gradually decreases in cross-sectional area as it extends away from the inlet 104, then sharply increases in cross-sectional area to define a seat or shoulder, shown as shoulder 244. The shoulder 244 is annular and extends substantially perpendicular to the longitudinal axis 106.

The body 102 further includes a second section, shown as cage portion 250, fixedly coupled (e.g., integrally formed with) the neck portion 240. The cage portion 250 is substantially cylindrical and also extends along and is substantially centered about the longitudinal axis 106. The cage portion 250 extends farther radially outward from the longitudinal axis 106 than the neck portion 240 (e.g., has a larger radius than the neck portion 240). The cage portion 250 includes two disk-shaped plates or members, shown as middle disk 252 and outer disk 254, each extending substantially perpendicular to the longitudinal axis 106. The middle disk 252 extends adjacent the neck portion 240, and the outer disk 254 is longitudinally offset from the middle disk 252. A pair of longitudinal members, shown as supports 256, extend directly between and couple the middle disk 252 and the outer disk 254. The supports 256 are diametrically opposed and extend substantially parallel to the longitudinal axis 106. A passage, shown as access passage 258, extends substantially perpendicular to the longitudinal axis 106 though the cage portion 250. Specifically, the access passage 258 extends between the middle disk 252, the outer disk 254, and the supports 256. The passage 242 intersects the access passage 258. The access passage 258 facilitates access to the passage 242 from the side of the body 102 opposite the inlet 104 (e.g., during assembly). The outer disk 254 defines an aperture, shown as outlet 260, extending therethough. The outlet 260 is substantially centered about the longitudinal axis 106. The outlet 260 intersects the access passage 258. Accordingly, the inlet 104 is fluidly coupled to the outlet 260 in certain configurations of the sprinkler 100 (e.g., when the button 108 is removed from the sprinkler 100).

Figure 3:
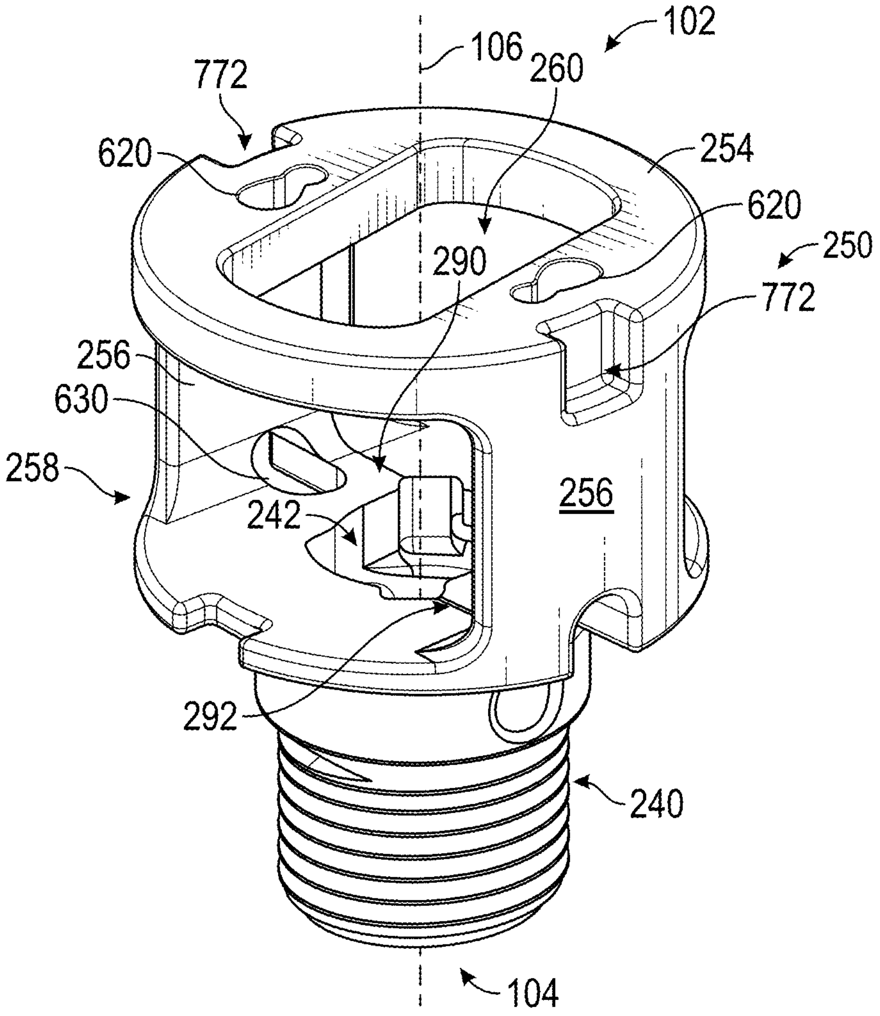
FIG. 3 is a perspective view of a body of the sprinkler of FIG. 2, according to an exemplary embodiment.
Figure 4:
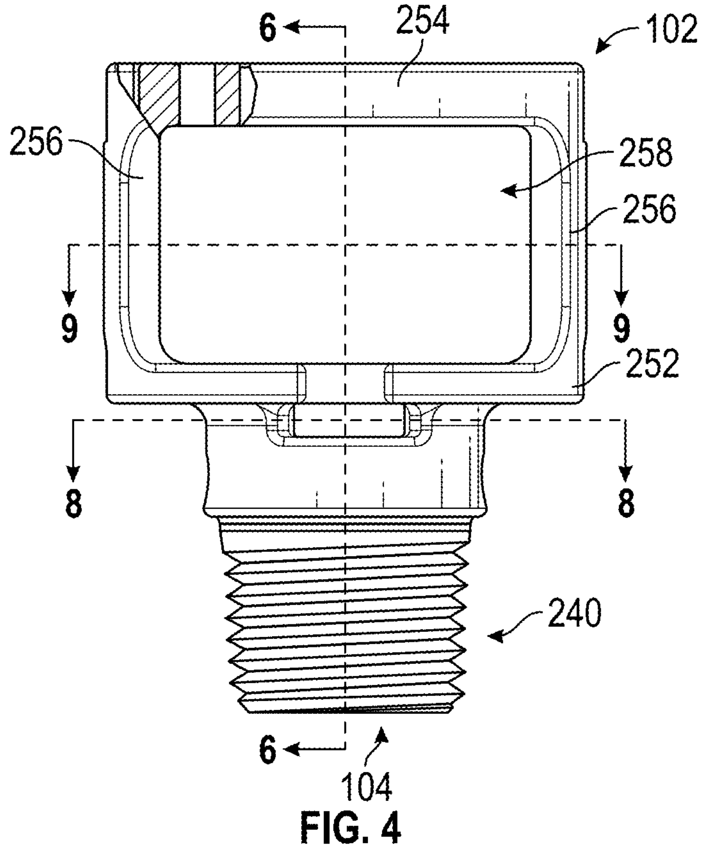
FIG. 4 is a partial front section view of the body of FIG. 3.
Figure 5:
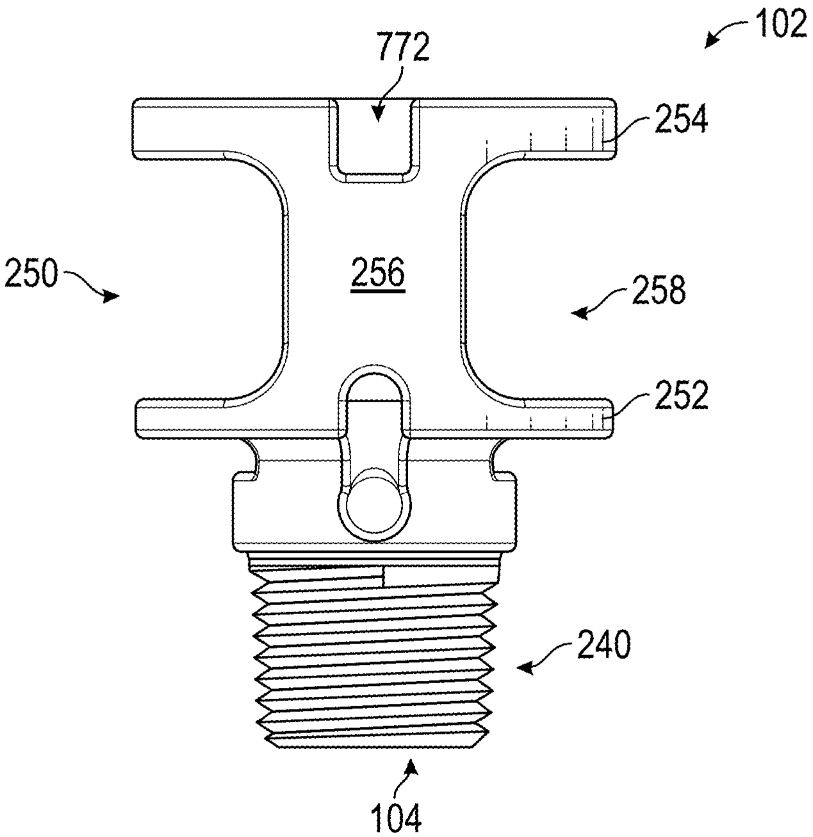
FIG. 5 is a right side view of the body of FIG. 3.

The body 102 may be manufactured by injection molding. To facilitate removal from a mold, the body 102 and/or other components of the sprinkler 100 may be formed with a draft angle (e.g., a 1 degree draft angle). Additionally, the mold used to form the body 102 may include two halves, each of which create half of the body 102. In one embodiment, each half is identical. As shown in FIG. 3, the two halves meet at a first part line 290 and a second part line 292. To avoid undercuts that may otherwise make removing parts of the mold difficult, the part line 290 and the part line 292 are offset from one another and meet the passage 242 at the point furthest from the longitudinal axis 106.

In operation, the inlet 104 is fluidly coupled to a supply of pressurized fire suppressant fluid. The pressurized fire suppressant fluid is held within the passage 242 by the button 108 and the spring seal 114. The lever arms 110 impart a longitudinal force on the button 108, holding the button 108 in place. The button 108 presses the spring seal 114 against the shoulder 244, fluidly decoupling the inlet 104 from the outlet 260. The fusible link 112 holds the lever arms 110 together. A flat surface of the body 102, shown in FIG. 6 as engagement surface 272, presses against the lever arms 110, holding the levers in place. If a first threshold temperature $T_1$ is met or exceeded, solder within the fusible link 112 melts, permitting the lever arms 110 to separate from one another. In some embodiments, first threshold temperature $T_1$ is 165 degrees Fahrenheit or 212 degrees Fahrenheit. In other embodiments, the first threshold temperature $T_1$ is another temperature. Pressure on the button 108 from the pressurized fire suppressant fluid and the force of the compressed spring seal 114 causes the lever arms 110 to begin rotating apart from one another. Eventually, the lever arms 110 rotate to the point where the lever arms 110 come free from engagement with the engagement surface 272. At this point, the force of the pressurized fire suppressant fluid forces the lever arms 110, the button 108, the fusible link 112, and/or the spring seal 114 out of the outlet 260. The inlet 104 is then fluidly coupled to the outlet 260, and the fire suppressant fluid flows freely through the sprinkler 100.

Deflector

Figure 10:
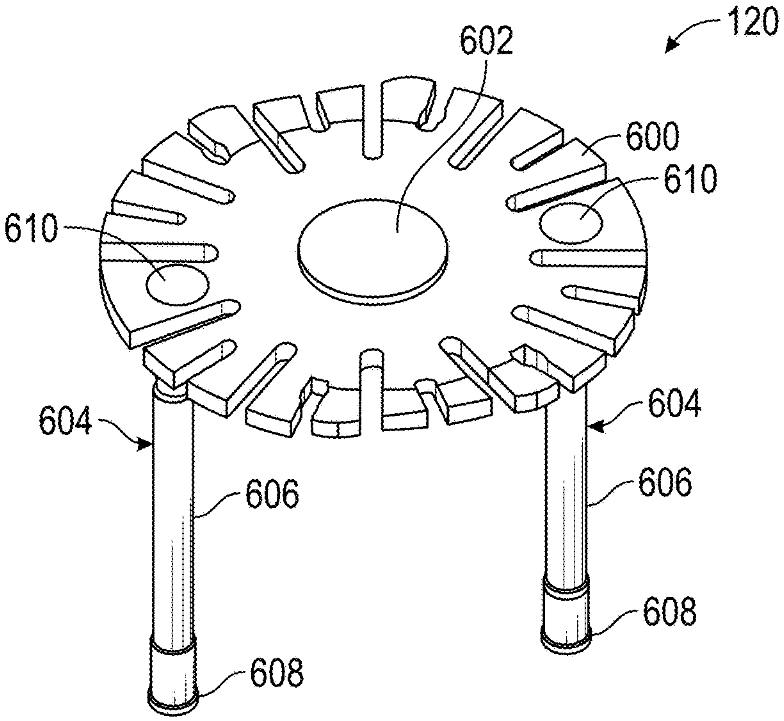
FIG. 10 is a perspective view of a deflector of the sprinkler of FIG. 2, according to an exemplary embodiment.
Figure 11:
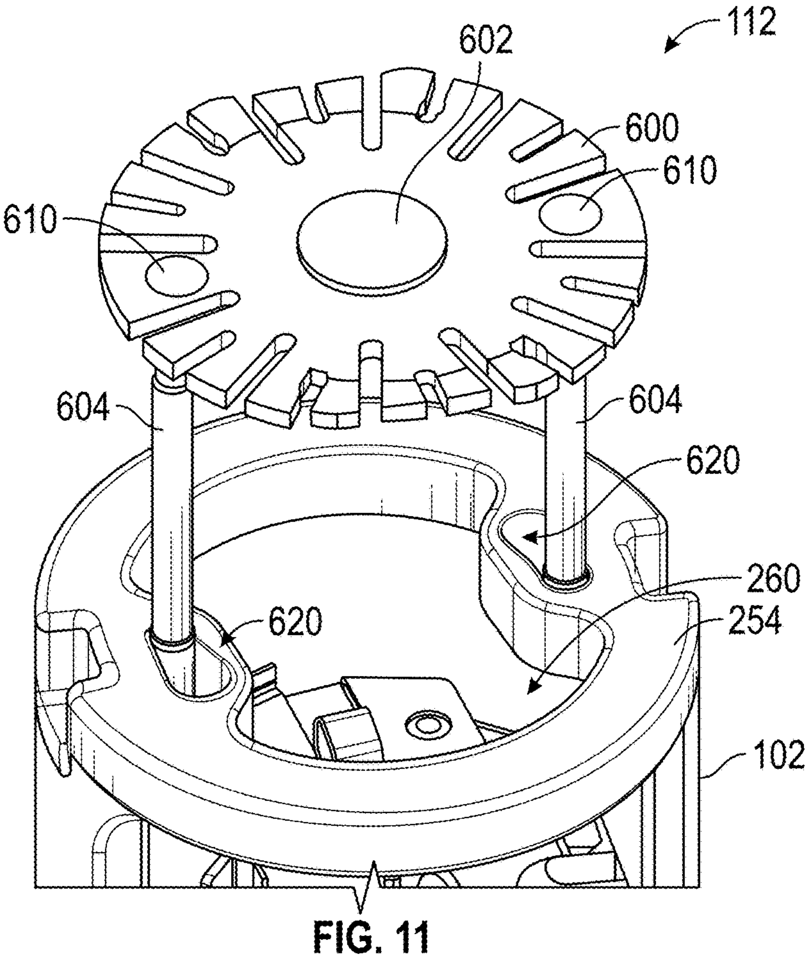
FIG. 11 is a perspective view of the sprinkler of FIG. 2.
Figure 12:
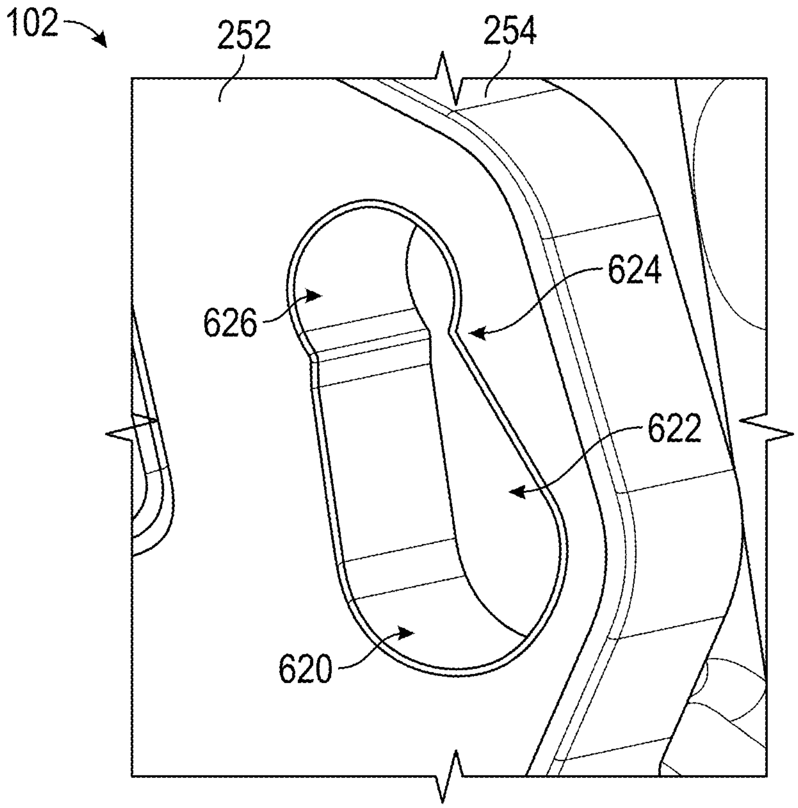
FIG. 12 is a detail view of the body of FIG. 3 showing an aperture configured to receive the deflector of FIG. 10, according to an exemplary embodiment.

Referring to FIGS. 2, 10, and 11, the deflector 120 is shown according to an exemplary embodiment. The deflector 120 includes a flat member or deflector body, shown as deflector plate 600, extending substantially perpendicular to the longitudinal axis 106. Near the center of the deflector plate 600, the deflector plate 600 defines an aperture that receives a rounded member, shown as nose cone 602. The nose cone 602 is coupled to the deflector plate 600. The nose cone 602 defines a conical, dome-shaped, or otherwise tapered and convex surface that faces toward the body 102.

A pair of pins, shown as guide pins 604, are coupled to the deflector plate 600. The guide pins 604 each extend substantially parallel to the longitudinal axis 106. The guide pins 604 are symmetrically offset from the longitudinal axis 106. Each guide pin 604 has a shaft portion 606. The shaft portion 606 has a first diameter near the deflector plate 600 and a second diameter larger than the first diameter near the end of the guide pin 604 opposite the deflector plate 600. At the end of the guide pin 604 opposite the deflector plate 600, the guide pin 604 has a collar or shoulder 608. The shoulder 608 has a third diameter larger than the second diameter. The guide pins 604 are each fixedly coupled to the deflector plate 600 at a connection point, shown as rivet 610. To form the rivets 610, the guide pins 604 are inserted through apertures defined by the deflector plate 600 and deformed (e.g., by a large compressive force). In other embodiments, the guide pins 604 are otherwise coupled to the deflector plate 600 (e.g., welded, adhered, etc.).

Referring to FIGS. 7, and 11-13, the outer disk 254 of the body 102 defines a pair of apertures, shown as apertures 620. The apertures 620 each include a first section, shown as entry section 622, a second section, shown as neck section 624, and a third section, shown as holding section 626. The entry section 622, the neck section 624, and the holding section 626 are all centered about the circumference of a circle centered about the longitudinal axis 106 (i.e., the centers of each of the entry section 622, the neck section 624, and the holding section 626 are all located the same distance from the longitudinal axis 106). The neck section 624 extends between and connects the entry section 622 and the holding section 626. The entry section 622 is larger than the third diameter of the guide pin 604 such that the shoulder 608 can pass freely through the entry section 622. The neck section 624 has a width smaller than the second diameter of the guide pin 604. The width of the neck section 624 can also be smaller than the first diameter of the guide pin 604. The holding section 626 is substantially circular and has a diameter slightly larger than the second diameter of the guide pin 604.

Figure 13:
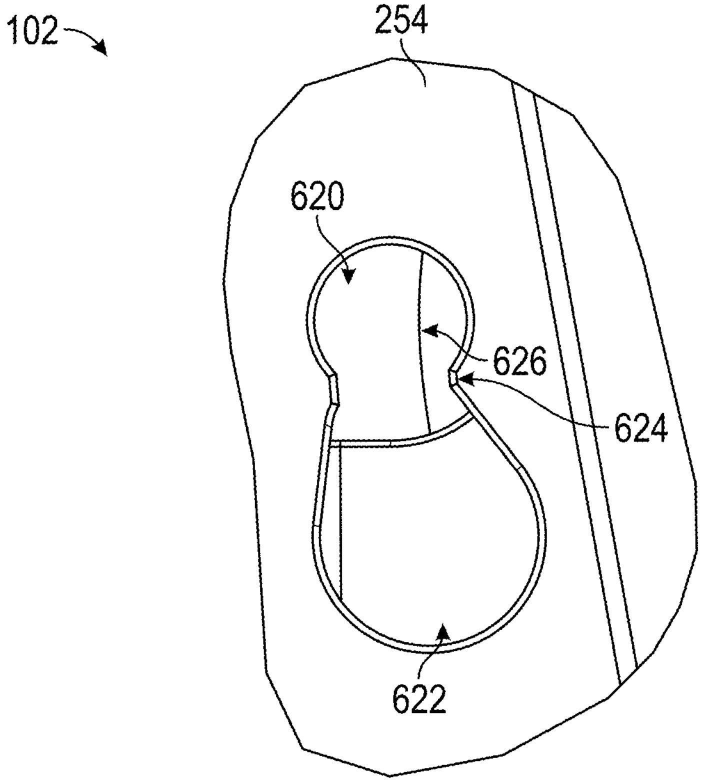
FIG. 13 is another detail view of the body of FIG. 3 showing the aperture of FIG. 12.
Figure 14:
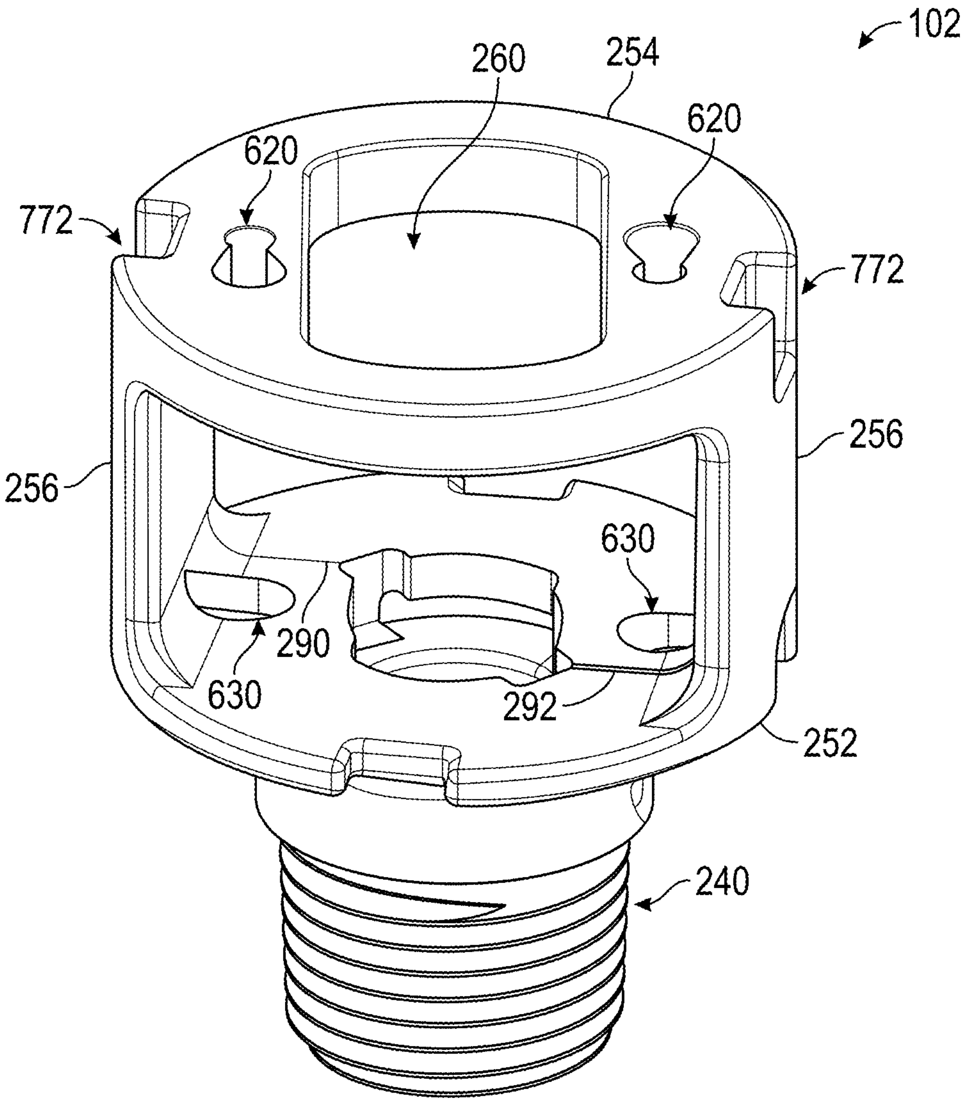
FIG. 14 is a perspective view of the body of FIG. 3.
Figure 15:
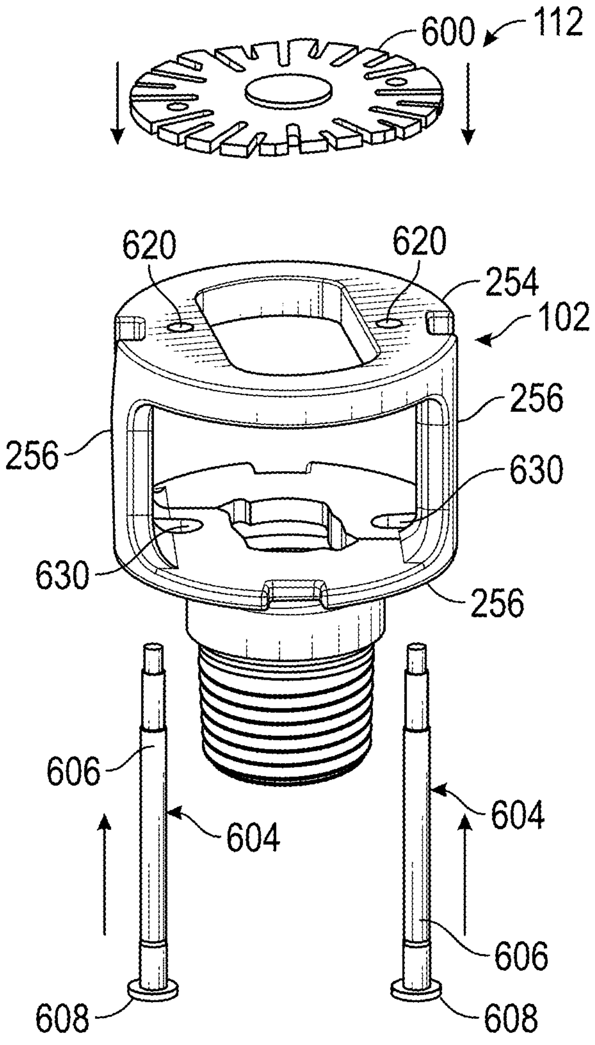
FIG. 15 is a perspective view showing the assembly of a deflector plate and a body of the sprinkler of FIG. 2, according to an exemplary embodiment.

Referring to FIGS. 13, 14, and 15, the middle disk 252 and the neck portion 240 of the body 102 define a pair of apertures, shown as guide pin apertures 630. The guide pin apertures 630 are longitudinally aligned with the holding sections 626. The guide pin apertures 630 extend immediately radially inward of the supports 256. The guide pin apertures 630 are larger than the third diameter of the guide pin 604, facilitating movement of the shoulders 608 through the guide pin apertures 630 to make the sprinkler 100 even more compact.

To couple the deflector 120 to the body 102, the guide pins 604 are inserted into the entry sections 622 of the apertures 620 until the shoulders 608 are positioned within the access passage 258. The deflector 120 is then rotated clockwise about the longitudinal axis 106 as shown in FIGS. 2 and 11. By way of example, a moment may be applied to the two guide pins 604 about the longitudinal axis 106. To hold the body 102 in place while rotating the deflector 120 into position, the operator may utilize a fixture. The guide pins 604 move through the neck sections 624 and into the holding sections 626. Because the widths of the neck sections 624 are smaller than the first diameter and/or the second diameter of the guide pins 604, the neck sections 624 deform slightly as the guide pins 604 move therethrough. As the guide pins 604 move into the holding sections 626, the neck sections 624 move back to their original free state, holding the guide pins 604 within the holding sections 626. The guide pins 604 are free to move longitudinally through the holding sections 626 until the shoulder 608 engages the neck portion 240 or the deflector plate 600 engages the outer disk 254. Accordingly, the deflector 120 is slidably coupled to the body 102. The deflector 120 is translatable along the longitudinal axis 106 between two positions: an extended or deployed position, shown in FIG. 2, and a retracted or stored position, shown in solid lines in FIG. 28. When the sprinkler 100 is installed, the deflector 120 hangs downward from the body 102. Accordingly, the deflector 120 is biased toward the deployed position by the force of gravity.

Figure 41:
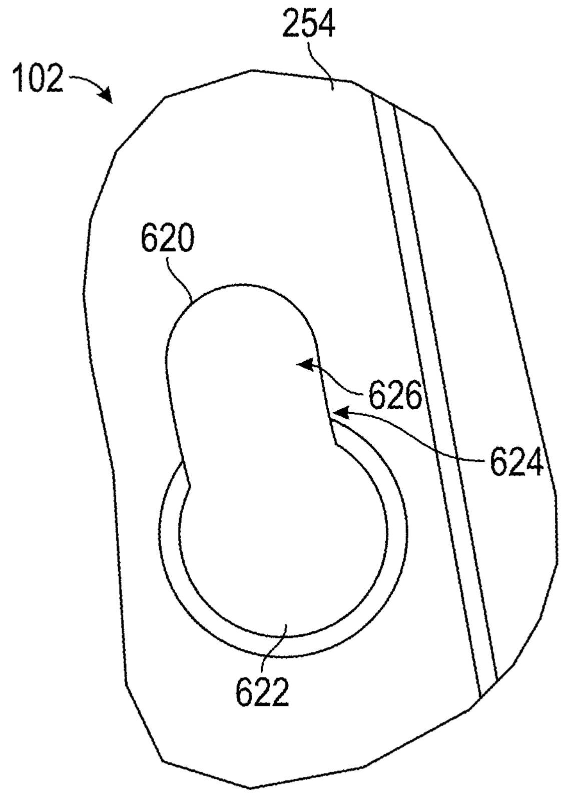
FIG. 41 is a detail view of a body of the sprinkler of FIG. 2 showing an aperture configured to receive a deflector, according to an exemplary embodiment.
Figure 42:
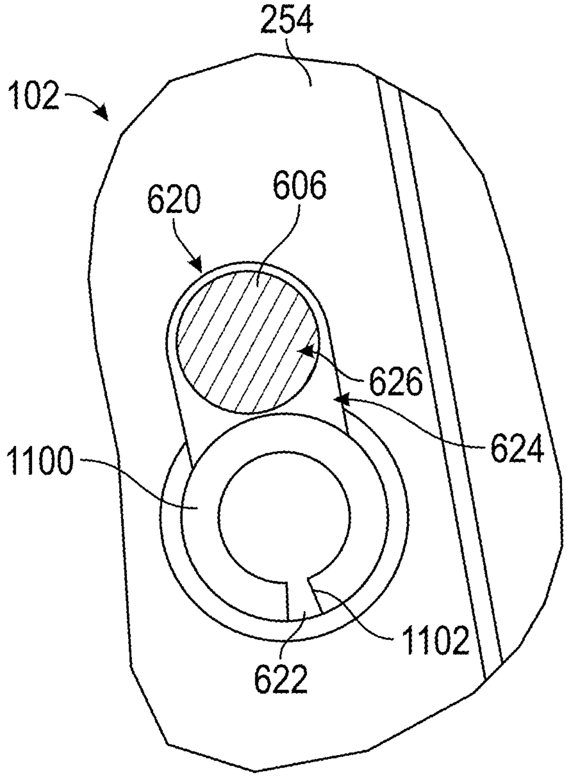
FIG. 42 is a detail view of the body of FIG. 41 showing the aperture receiving the deflector.

Referring to FIGS. 41 and 42, an alternative embodiment of the deflector 120 and the body 102 is shown. This embodiment may be substantially similar to the embodiment shown in FIG. 13 except as otherwise stated herein. In this embodiment, the neck section 624 is approximately the same width as a diameter of the holding section 626. Accordingly, the shaft portion 606 of the guide pin 604 is free to move along a length of the aperture 620. This arrangement may be advantageous in situations where the material surrounding the aperture 620 does not offer sufficient elastic deformation to retain the guide pin 604 in the holding section 626.

To retain the guide pin 604 within the holding section 626, a blocking member, a blocking pin, a retaining member, or fastener (e.g., a roll pin), shown as spring pin 1100, is inserted into the entry section 622 after the guide pin 604 has translated into the holding section 626. In some embodiments, the spring pin 1100 is substantially cylindrical. As shown, the spring pin 1100 is annular with a slit 1102 extending therethrough to permit variation in the diameter of the spring pin 1100. In a free state, the spring pin 1100 may have an uncompressed diameter. Force may be applied to the spring pin to elastically deform the spring pin 1100, reducing the diameter of the spring pin 1100 to a reduced diameter. Specifically, one or more surfaces of the spring 1100 and/or the aperture 620 may be tapered (e.g., chamfered, filleted, etc.) such that the spring pin 1100 is compressed to the reduced diameter when pressed into the aperture 620. The spring pin 1100 is then biased against an inner wall of the aperture 620 such that friction holds the spring pin 1100 in place.

The shaft section 606 of the guide pin 604, the spring pin 1100, and/or the aperture 620 may be sized to limit movement of the guide pin 604 along a length of the aperture 620. By way of example, in the compressed state, the spring pin 1100 may have the same radius as the entry section 622. The holding section 626 may have a slightly larger radius than that of the shaft section 606 of the guide pin 604 to permit the guide pin 604 to move longitudinally freely therethrough. A distance between the holding section 626 and the entry section 622 (e.g., the length of the neck section 624) may be sized to limit the distance between the spring pin 1100 and the guide pin 604. In some embodiments, the shaft section 606 is approximately tangent to the spring pin 1100. The space between the spring pin 1100 and the wall of the holding section 626 may be slightly larger than the shaft section 606 (e.g., such that the shaft section 606 is slightly separated from the spring pin 1100 to facilitate free longitudinal movement of the deflector 120).

Figure 16:
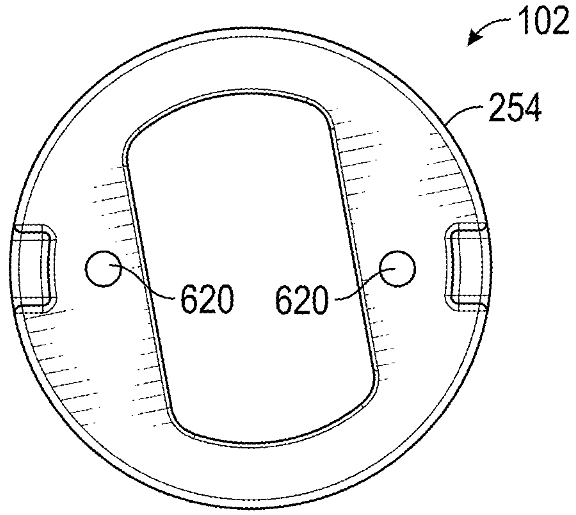
FIG. 16 is a top view of the body of FIG. 15.

Referring to FIGS. 15 and 16, an alternative embodiment of the deflector 120 and the body 102 is shown. In this embodiment, the entry sections 622 and the neck sections 624 are omitted, and the holding sections 626 are circular and enclosed. To assemble the sprinkler 100 shown in FIGS. 15 and 16, the guide pins 604 are inserted through the guide pin apertures 630 and subsequently through the apertures 620. Once the guide pins 604 extend beyond the outer disk 254, the rivets 610 are formed.

Figure 17:
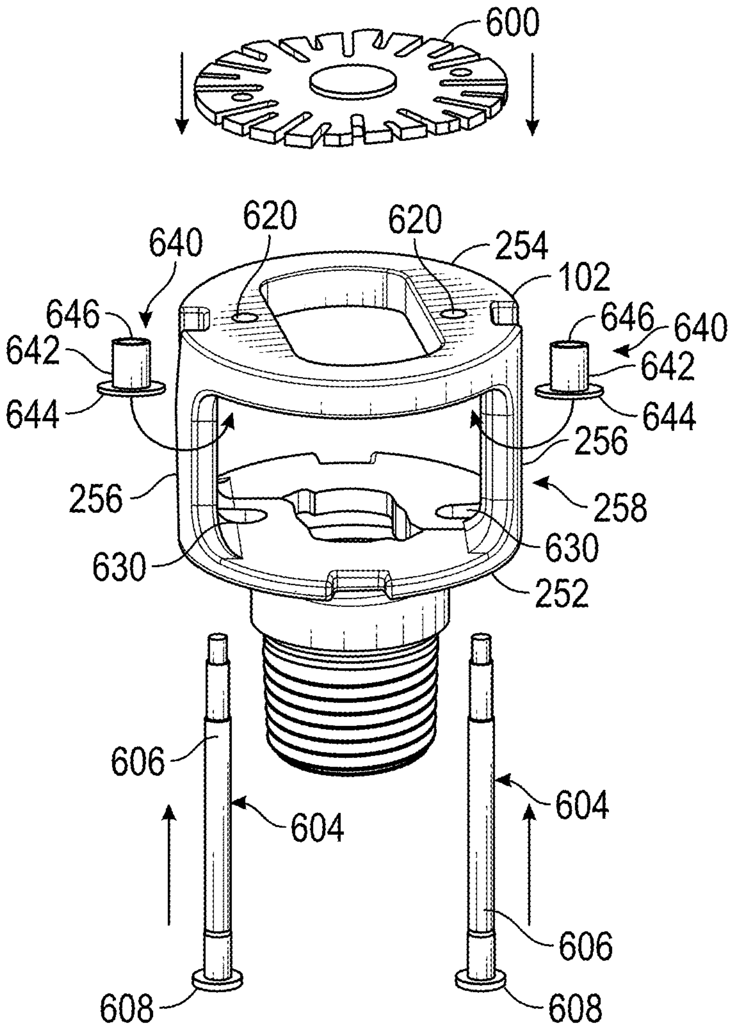
FIG. 17 is a perspective view showing the assembly of a deflector plate and a body of the sprinkler of FIG. 2, according to another exemplary embodiment.
Figure 18:
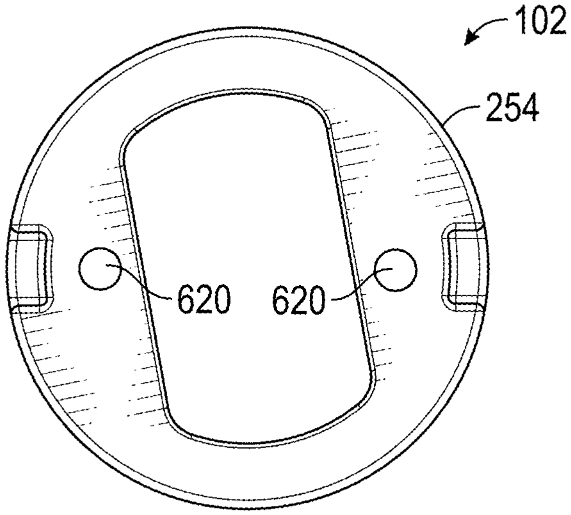
FIG. 18 is a top view of the body of FIG. 16.

Referring to FIGS. 17 and 18, another alternative embodiment of the deflector 120 and the body 102 is shown. In this embodiment, the entry sections 622 and the neck sections 624 are omitted, and the holding sections 626 are circular and enclosed. The sprinkler 100 further includes a pair of load distribution members, shown as bushings 640. The bushings 640 each include a main body 642 coupled to a flange 644. The flange 644 has a greater diameter than the main body 642. An aperture, shown as bushing aperture 646, extends through the main body 642 and the flange 644. To assemble the sprinkler 100 shown in FIGS. 17 and 18, the bushings 640 are inserted into the apertures 620 such that the flanges 644 are positioned within the access passage 258. In some embodiments, the main body 642 and the apertures 620 are sized such that the bushings 640 are coupled to the body 102 by a press fit. In other embodiments, the bushings 640 are otherwise coupled to the body 102 (e.g., using adhesive, etc.). The guide pins 604 are then inserted through the guide pin apertures 630 and subsequently through the bushing apertures 646. Once the guide pins 604 extend beyond the outer disk 254, the rivets 610 are formed.

Figure 19:
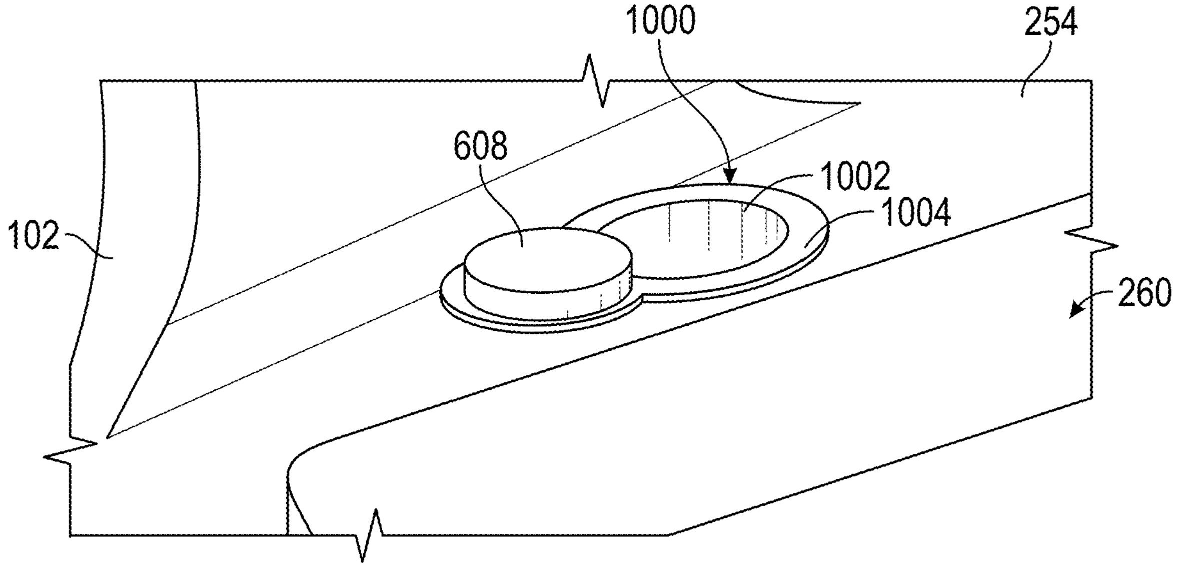
FIG. 19 is a perspective view showing the assembly of a deflector plate and a body of the sprinkler of FIG. 2, according to an exemplary embodiment.

Referring to FIG. 19, the body 102 is shown according to an alternative embodiment. In this embodiment, the body 102 is configured to utilize the deflector 120 shown in FIG. 11. However, instead of the body 102 defining apertures 620 that receive the guide pins 604 directly, the apertures 620 receive load distribution members, shown in FIGS. 19-21 as bushings 1000, that in turn receive the guide pins 604. The bushings 1000 each include a main body 1002 coupled to a flange 1004. The flange 1004 has a greater width than the main body 1002. The main bodies 1002 of the bushings 1000 are inserted into the apertures 620 and coupled to the body 102 (e.g., using a press fit, using adhesive, using a fastener, etc.). An aperture, shown as bushing aperture 1010, extends through the main body 1002 and the flange 1004. The bushing aperture 1010 includes a first section, shown as entry section 1012, a second section, shown as neck section 1014, and a third section, shown as holding section 1016. The entry section 1012, the neck section 1014, and the holding section 1016 are positioned, shaped, and sized identically to the entry section 622, the neck section 624, and the holding section 626 shown in FIG. 13. Accordingly, the deflector 120 may be coupled to the body 102 by inserting the guide pins 604 through the entry sections 1012 and rotating the deflector 120 about the longitudinal axis 106, similar to the process described herein with respect to FIG. 11.

The bushings 1000 are made from a material that is stronger than that of the body 102 (e.g., a metal, such as stainless steel or brass). The bushings 1000 are configured to distribute loads imparted on the body 102 by the guide pins 604 out over a larger area of the body 102, reducing the stresses within the body 102. Such a load may be experienced when fire suppressant fluid flows out of the outlet 260 and engages the deflector 120. Specifically, the shoulder 608 engages the flange 1004, and the flange 1004 engages the body 102. The flange 1004 has a larger surface area than the shoulder 608, which spreads the load out over a larger area. This reduces the potential for the body 102 to fail under load.

Figure 22:
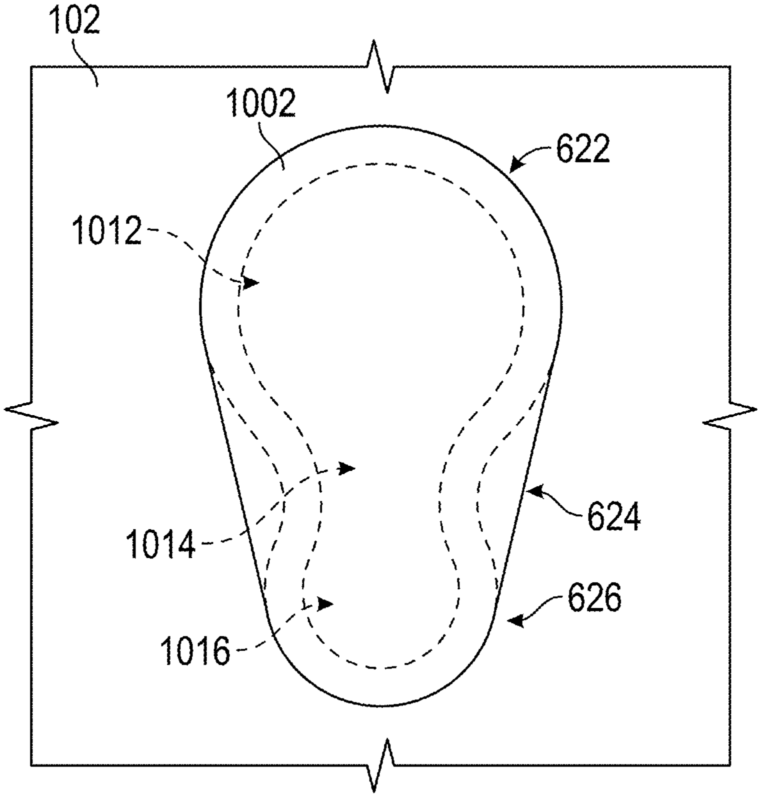
FIG. 22 is a top view of the body of the FIG. 19.

In some embodiments, the apertures 620 have similar shapes to the aperture 620 shown in FIG. 13, but are larger to accommodate the thickness of the main body 1002. In other embodiments, such as the embodiment shown in FIG. 22, the neck sections 624 are widened such that the part of the main body 1002 that defines the neck section 1014 does not engage the body 102. In FIG. 22, the main body 1002 is shown in dashed lines. Introducing a space between the neck section 1014 of the main body 1002 and the body 102 facilitates the neck section 1014 expanding outward to permit the passage of the guide pin 604 therethrough. These spaces may facilitate the use of materials in the bushing 1000 that would otherwise resist this expansion.

Figure 20:
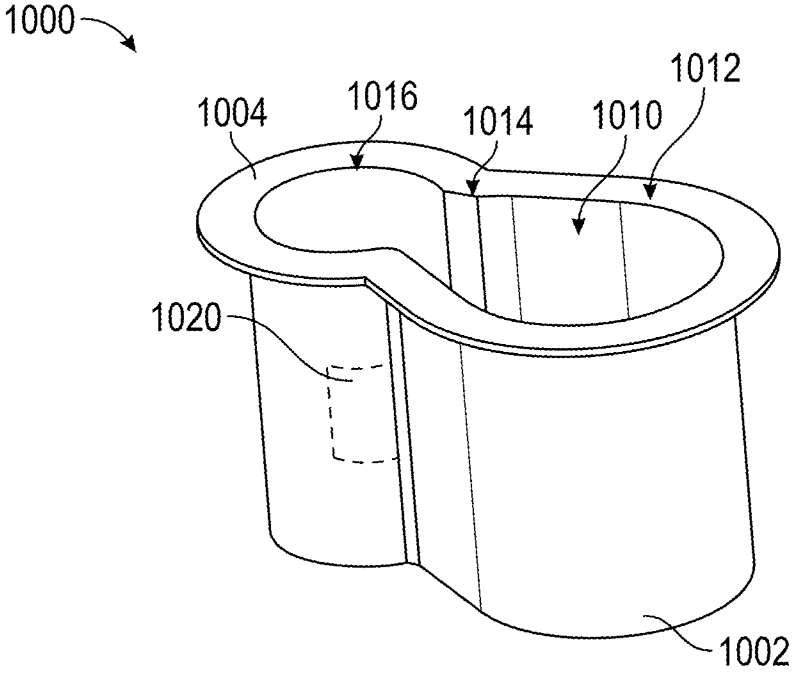
FIG. 20 is a perspective view of a bushing of the sprinkler of FIG. 2, according to an exemplary embodiment.
Figure 21:
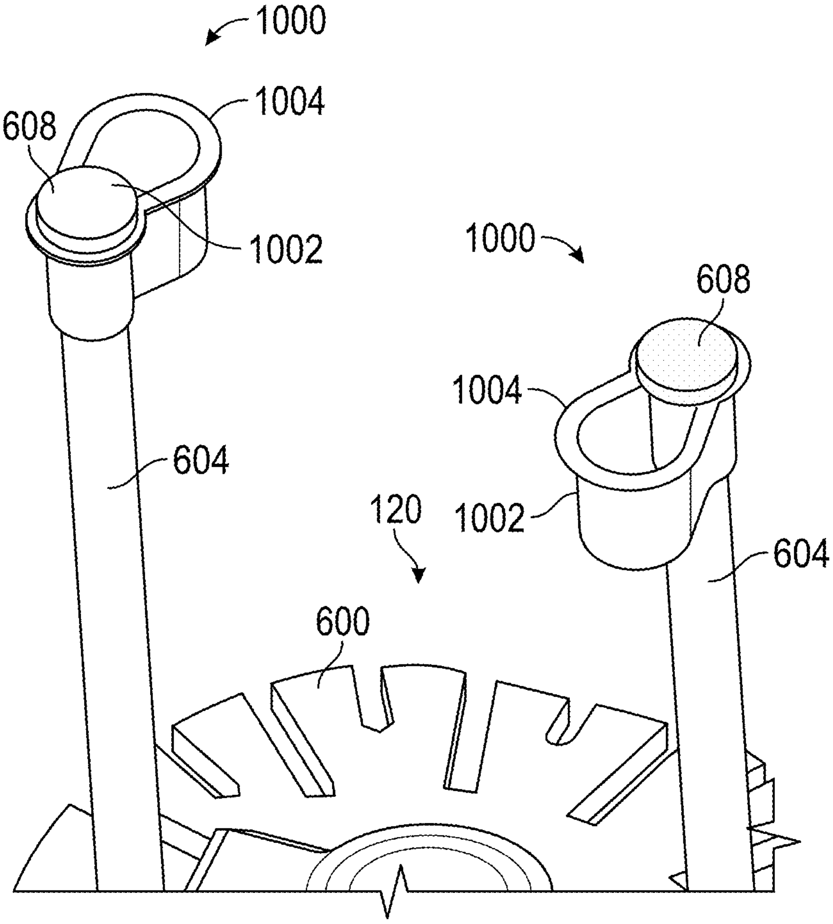
FIG. 21 is a perspective view of the deflector plate of FIG. 19 coupled to the bushings of FIG. 20.
Figure 23:
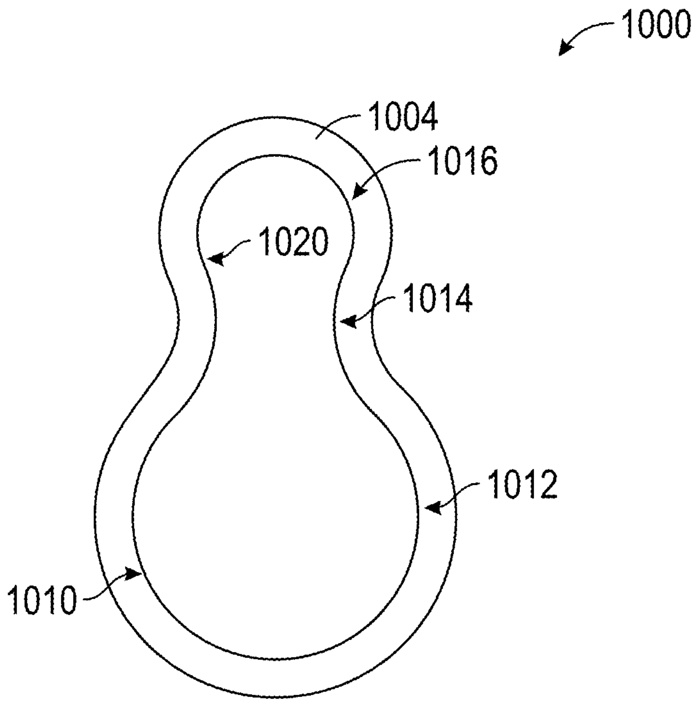
FIG. 23 is a top view of the bushing of FIG. 20.
Figure 24:
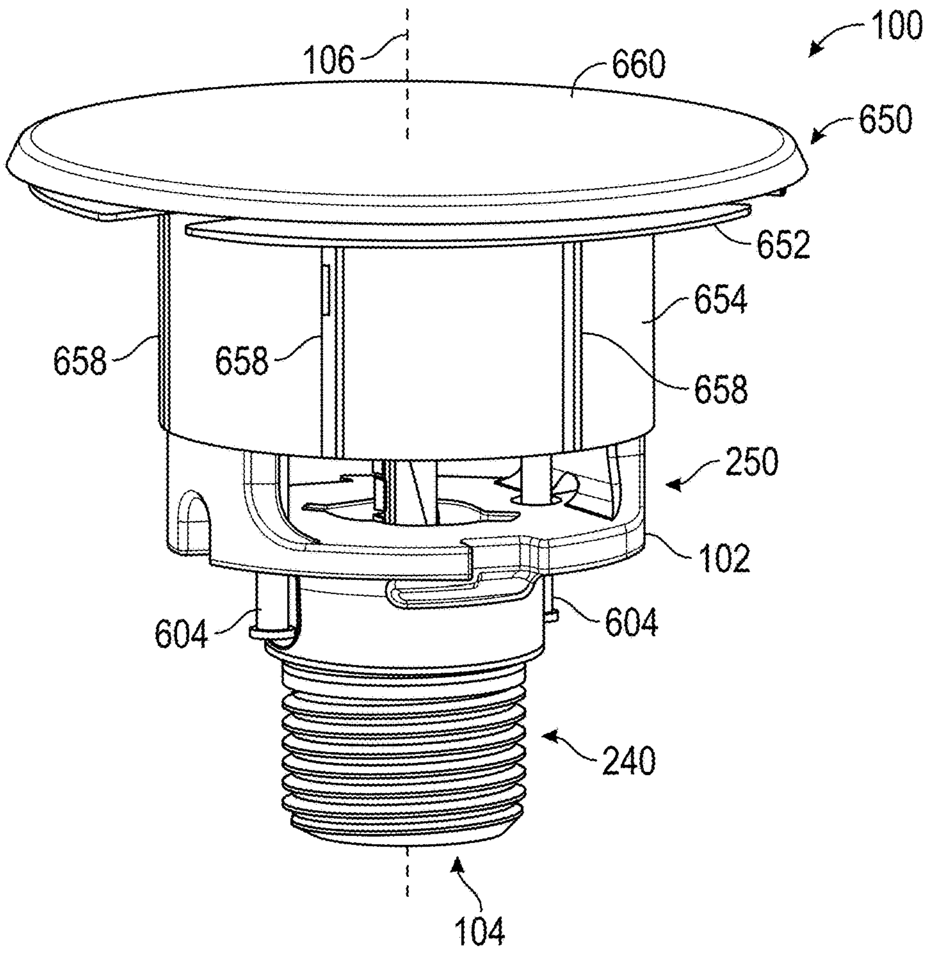
FIG. 24 is a perspective view of a cover plate assembly coupled to the sprinkler of FIG. 2, according to an exemplary embodiment.
Figure 25:
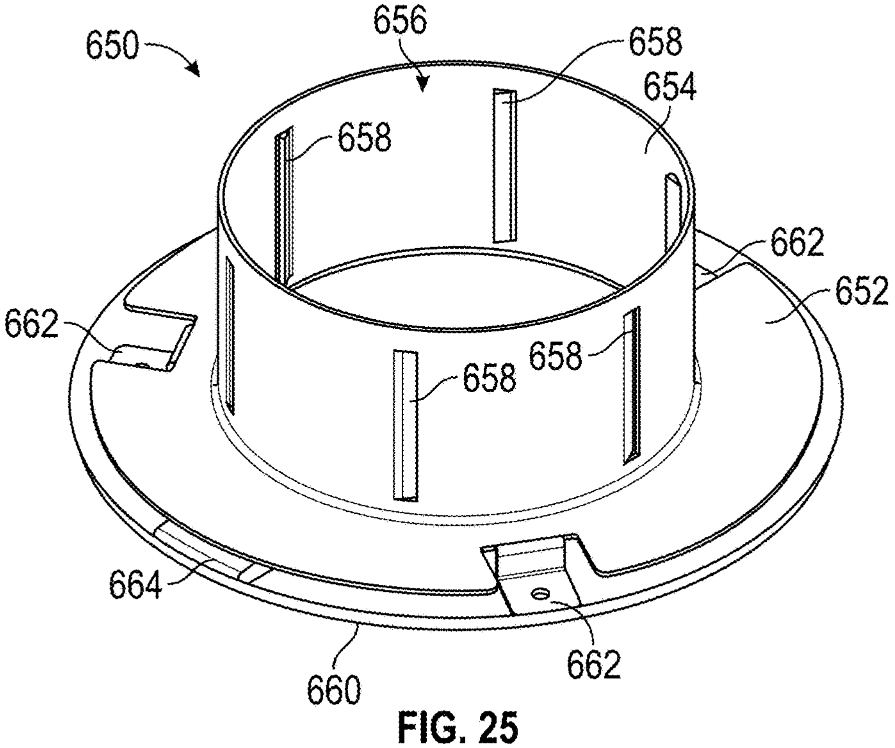
FIG. 25 is a perspective view of the cover plate assembly of FIG. 24.
Figure 26:
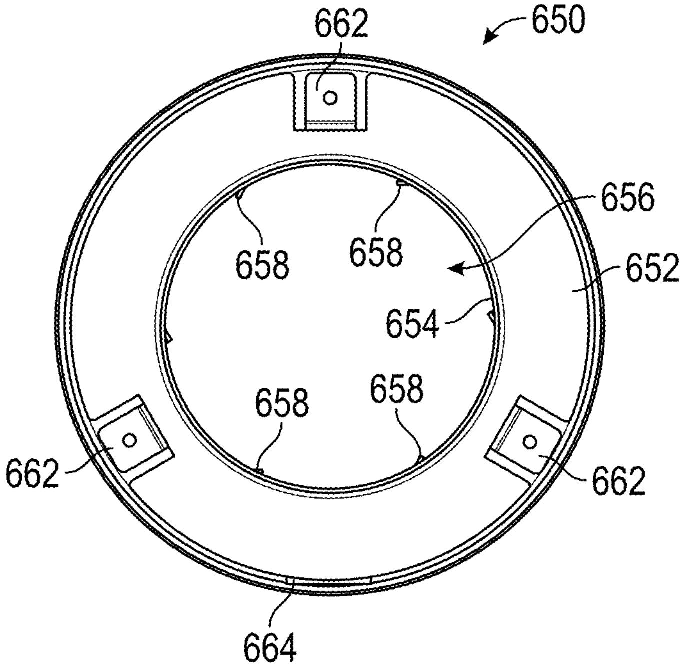
FIG. 26 is a top view of the cover plate assembly of FIG. 24.
Figure 27:
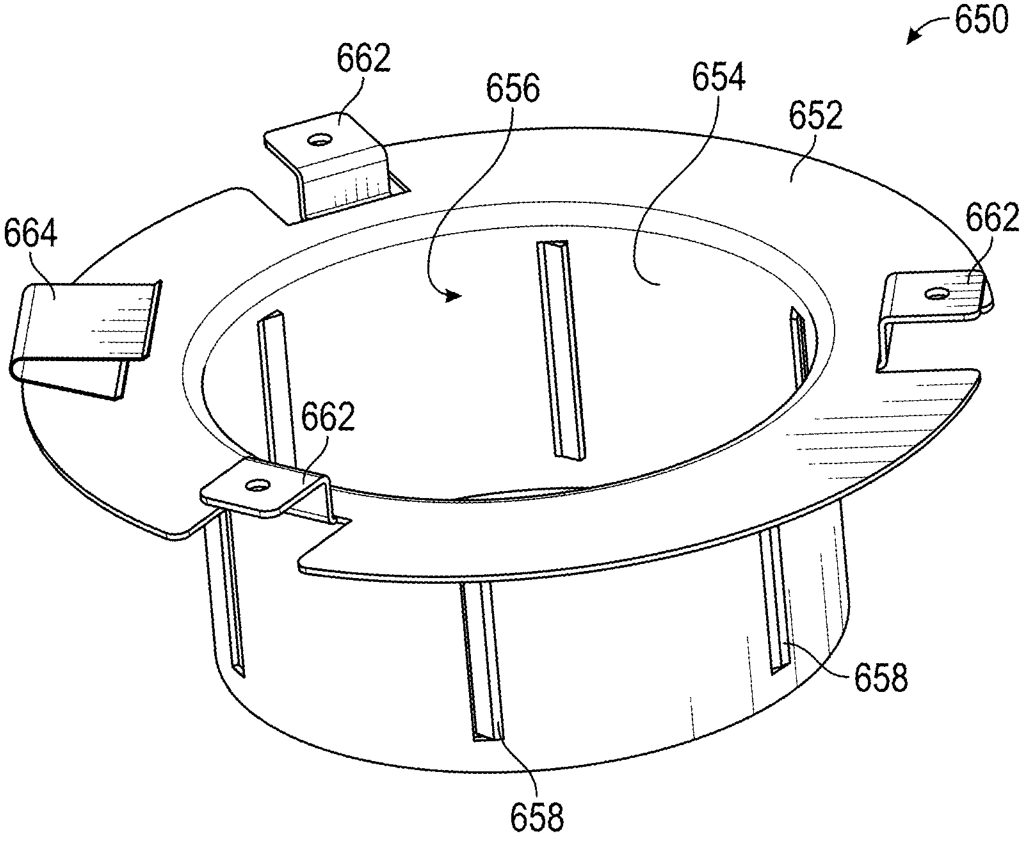
FIG. 27 is a perspective view of the cover plate assembly of FIG. 24.

Referring to FIGS. 20 and 23, in some embodiments, the bushing 1000 includes a protrusion or stop, shown as latch 1020. The latch 1020 is biased to extend into the holding section 1016. As shown in FIG. 20, in some embodiments, the latch 1020 is formed by cutting a portion of the main body 1002 and bending it inward such that bend in the material imparts the biasing force. The latch 1020 is configured to easily deflect out of the path of the guide pin 604 when the guide pin 604 is introduced into the holding section 1016. However, once the guide pin 604 is fully seated within the holding section 1016, the latch 1020 is biased back into its original position. Once in the original position, the latch 1020 extends at least partway across the neck section 1014, resisting or preventing the guide pin 604 from moving back through the neck section 1014. In embodiments that include the latch 1020, the neck section 1014 may be widened such that the deflection of the main body 1002 is lessened.

In an alternative embodiment, a load distribution member (e.g., similar to the flange 1004 of the bushing 1000) is embedded into the body 102. This may be accomplished by insert molding the load distribution member into the body 102 when the body 102 is injection molded. The load distribution member may be located anywhere throughout the thickness of the outer disk 254. This load distribution member may reduce the stresses within the body 102 in a similar fashion to the bushing 1000.

Cover Plate Assembly

Referring to FIGS. 24-27, the sprinkler 100 can utilize a decorative or protective covering, shown as cover plate assembly 650, that is configured to obscure the body 102 of the sprinkler 100 from view. The cover plate assembly 650 includes a flat member, shown as outer ring 652. The outer ring 652 is annular and flat. Fixedly coupled to (e.g., integrally formed with, welded to, etc.) the outer ring 652 is a cylindrical member, shown as retaining ring 654. The retaining ring 654 extends longitudinally away from the outer ring 652. An aperture, shown as receiving passage 656, extends longitudinally through both the outer ring 652 and the retaining ring 654. A series of protrusions, shown as retaining tabs 658, extend radially inward from the retaining ring 654 into the receiving passage 656. In one embodiment, the retaining tabs 658 are formed by bending sections of the retaining ring 654 inward. Each of the retaining tabs 658 extend substantially the same radial distance into the receiving passage 656. The retaining tabs 658 are biased radially inward (e.g., by their shape and material properties). Accordingly, the retaining tabs 658 can deflect radially outward, deforming elastically, and spring back to the same initial position.

The cover plate assembly 650 further includes a decorative or protective plate, shown as cover plate 660. A series of projections, shown as tabs 662 extend longitudinally from the outer ring 652 in a direction opposite the retaining ring 654. In some embodiments, the tabs 662 are formed by bending a portion of the outer ring 652 outward. The cover plate 660 is coupled to the tabs 662 with a solder alloy that melts at a second threshold temperature $T_2$. Accordingly, when the temperature of the cover plate assembly 650 is at or above the second threshold temperature $T_2$ (e.g., due to a high ambient temperature such as that indicative of a nearby fire), the solder melts, decoupling the cover plate 660 from the outer ring 652. The second threshold temperature $T_2$ is less than the first threshold temperature $T_1$. In some embodiments, the second threshold temperature is approximately 135 degrees Fahrenheit. In other embodiments, the second threshold temperature $T_2$ is another temperature. The cover plate assembly 650 further includes a biasing element, shown as compression spring 664. The compression spring 664 is positioned between the outer ring 652 and the cover plate 660. The compression spring 664 is configured to apply a biasing force directed to separate the outer ring 652 and the cover plate 660. The compression spring 664 helps to break the surface tension of the melted solder, facilitating the separation of the cover plate 660 from the outer ring 652 when the threshold temperature $T_2$ is exceeded.

The retaining ring 654 is configured to receive the cage portion 250 of the body 102. The cage portion 250, which is formed from the middle disk 252, the outer disk 254, and the supports 256, has a substantially cylindrical outer surface. The retaining ring 654 and the receiving passage 656 are also substantially cylindrical. The diameter of the receiving passage 656 is greater than that of the cage portion 250 such that the cage portion 250 can move through the receiving passage 656. In a free state, the retaining tabs 658 extend farther radially inward than the outer surface of the cage portion 250. To assemble the cover plate assembly 650 with the body 102, the cage portion 250 is inserted into the end of the receiving passage 656 opposite the cover plate 660, aligning the receiving passage 656 with the longitudinal axis 106. As the cage portion 250 moves into the receiving passage 656, the cage portion 250 engages the retaining tabs 658, pushing the retaining tabs 658 radially outward. This deforms the retaining tabs 658, and the biasing force of the retaining tabs 658 pushes radially inward against the outer surface of the cage portion 250. The resultant friction between the retaining tabs 658 and the body 102 couples the cover plate assembly 650 to the body 102.

Figure 28:
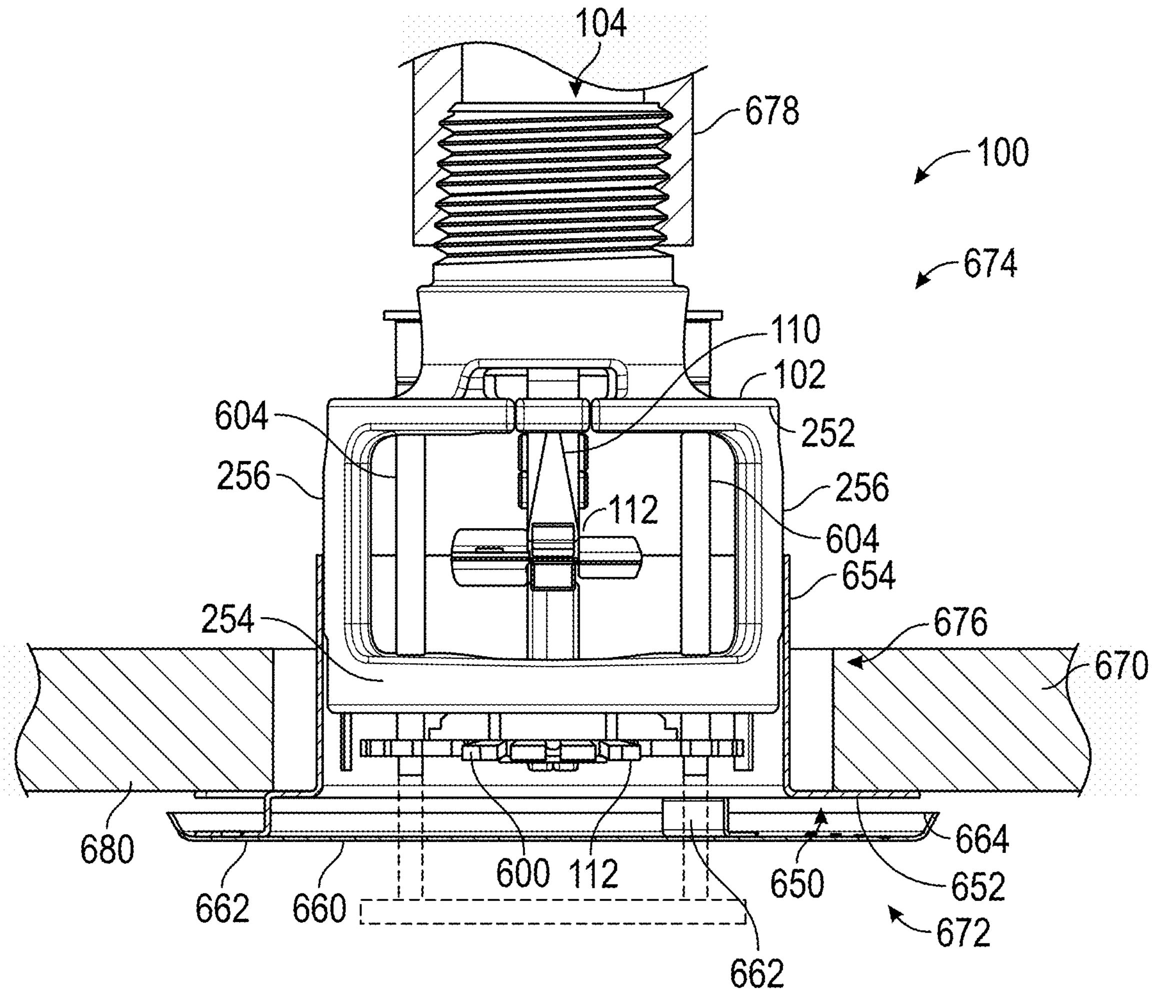
FIG. 28 is a front section view showing the sprinkler assembly of FIG. 2 and the cover plate assembly of FIG. 24 installed in a ceiling, according to an exemplary embodiment.

Referring to FIG. 28, the sprinkler 100 is shown installed within a ceiling of a room, according to an exemplary embodiment. A ceiling tile or sheet of drywall, shown as ceiling covering 670, divides a room into a first volume 672 (e.g., a below-ceiling volume, an occupied volume, a visible volume, etc.) below the ceiling covering 670 and a second volume 674 (e.g., an above-ceiling volume, a storage volume, an obscured volume, etc.) above the ceiling covering 670. The ceiling covering 670 defines an aperture 676, through which the sprinkler 100 is installed. The body 102 extends upward through the aperture 676 and into the second volume 674. In the second volume 674, the body 102 threadedly engages a fitting 678 of the conduit 16, such that the fitting 678 and the conduit 16 support the body 102. The retaining ring 654 receives the body 102 and is received within the aperture 676. The cover plate assembly 650 is pushed upward until the cover plate 660 and/or the outer ring 652 engage a bottom surface, shown as visible surface 680, of the ceiling covering 670. In some embodiments, the visible surface 680 is planar. Because of how the retaining tabs 658 couple the cover plate assembly 650 to the body 102, the cover plate assembly 650 can move relative to the body 102 to adapt to different distances between the fitting 678 and the visible surface 680 of the ceiling covering 670. Additionally, the cover plate assembly 650 can be coupled to the body 102 in any orientation. The cover plate assembly 650 does not need to be indexed relative to the body 102 prior to engagement, unlike other methods of coupling a cover plate assembly to a sprinkler body. This further simplifies the assembly process.

As shown in FIG. 28, the cover plate 660 extends across the aperture 676 such that the only visible part of the sprinkler 100 is the cover plate 660. The cover plate 660 can be painted, dyed, plated, or otherwise colored and/or textured to match or otherwise appear aesthetically pleasant next to the visible surface 680 of the ceiling covering 670. By way of example, the cover plate 660 may be brass plated with chrome or copper plated with brass. Accordingly, the cover plate 660 makes the sprinkler 100 more aesthetically pleasing. With the cover plate assembly 650 installed, the deflector 120 drops down through the receiving passage 656 and rests on a top surface of the cover plate 660. In the event of a fire, the ambient temperature within the room (e.g., within the first volume 672) gradually increases. As the ambient temperature rises above the second threshold temperature $T_2$, the solder within the cover plate assembly 650 begins to melt, and the cover plate 660 decouples from the outer ring 652. The cover plate 660 drops to the floor, and the deflector 120 drops to the deployed position. In the deployed position, the deflector plate 600 is offset below the visible surface 680 of the ceiling covering 670 to prevent spraying fire suppressant fluid onto and/or above the ceiling covering 670. An example of the deployed position is shown in dashed lines in FIG. 28. As the ambient temperature rises above the first threshold temperature $T_1$, the solder within the fusible link 112 begins to melt, allowing the fusible link 112 to separate. As the fusible link 112 separates, the lever arms 110 separate and the button 108 moves away from the inlet 104, allowing fire suppressant fluid to flow through the sprinkler 100. The fire suppressant fluid flows out of the outlet 260 and engages the deflector 120. The deflector 120 spreads the fire suppressant fluid laterally, and the fire is contained. Because the first threshold temperature $T_1$ is greater than the second threshold temperature $T_2$, the cover plate 660 drops before the fusible link 112 separates. This ensures that the deflector 120 is in position and that the cover plate 660 is not an obstruction prior to flowing fire suppressant fluid.

Protective Cap

Referring to FIGS. 29-39, a cover or cap, shown as protective cap 700, is shown according to an exemplary embodiment. In this embodiment, the protective cap 700 is injection molded as a single piece from polymeric material. The protective cap 700 extends along and is centered about a longitudinal axis 702. The protective cap 700 includes a main body 704 having an annular wall, shown as side wall 706, and a flat wall, shown as end wall 708. A protrusion or projection, shown as post 710, extends from the end wall 708 away from the side wall 706.

The side wall 706 has a first surface, shown as inner surface 720, nearest the longitudinal axis 702 and a second surface, shown as outer surface 722, opposite the inner surface 720. The inner surface 720 extends substantially parallel to the longitudinal axis 702, and the outer surface 722 is tapered or angled relative to the longitudinal axis 702. In one embodiment, the outer surface 722 gradually (e.g., linearly, etc.) increases in diameter as it extends toward the end wall 708. A recess or passage, shown as body receiving recess 724, extends from the end of the side wall 706 opposite the end wall 708 into the post 710. The body receiving recess 724 is defined in part by the inner surface 720.

The post 710 includes a first section, shown as threaded section 730, and a second or tapered section, shown as conical section 732. The threaded section 730 extends between the end wall 708 and the conical section 732. The threaded section 730 is threaded with an external male thread. Specifically, the threaded section 730 uses a 0.5 inch NPT thread. In other embodiments, the threaded section 730 uses a different type of thread (e.g., straight thread, ISO thread, etc.). Although the threaded section 730 is shown as defining three individual threads, the threaded section 730 can define any number of individual threads (e.g., two threads, four threads, seven threads, etc.) of any pitch (e.g., 20 threads per inch, 32 threads per inch, etc.). The conical section 732 terminates in a point, shown as marking point 734, that is positioned along the longitudinal axis 702. An aperture or passage, shown as weep hole 736, extends radially through the threaded section 730 and intersects the body receiving recess 724. The weep hole 736 fluidly couples the body receiving recess 724 with the surroundings. In other embodiments, the weep hole 736 extends through another part of the post 710 or through the main body 704. By way of example, the weep hole 736 can extend at an angle (e.g., 45 degrees offset from the longitudinal axis 702, etc.) through the conical section 732.

The end wall 708 defines a pair of recesses, reliefs, slots, grooves, or apertures, shown as wrench reliefs 740. The wrench reliefs 740 are positioned on an outer radial surface and a longitudinal end surface of the end wall 708 opposite the side wall 706. The wrench reliefs 740 are diametrically opposed, and each have a substantially rectangular cross section. In other embodiments, the quantity, cross-sectional shape, and location of the wrench reliefs 740 are varied.

The outer surface 722 defines a pair of visual indicators, gauges, markings, grooves, slots, or embossed features, shown as maximum position groove 750 and minimum position groove 752. The maximum position groove 750 and the minimum position groove 752 are annular and extend around the entire circumference of the outer surface 722. The maximum position groove 750 and the minimum position groove 752 extend substantially perpendicular to the longitudinal axis 702. The maximum position groove 750 and the minimum position groove 752 are longitudinally offset from one another a distance D. In some alternative embodiments, the maximum position groove 750 and/or the minimum position groove 752 are another type of visual indicator, such as an ink marking or an embossed feature. In some alternative embodiments, the maximum position groove 750 and/or the minimum position groove 752 extend only around a portion of the circumference of the outer surface 722. In some alternative embodiments, the maximum position groove 750 and/or the minimum position groove 752 are replaced with a single marking having a width equal to the distance D (e.g., that extends from where the maximum position groove 750 is located to where the minimum position groove 752 is located).

A pair of first protrusions, projections, or bosses, shown as body lugs 760, extend radially inward into the body receiving recess 724 from the inner surface 720. The body lugs 760 extend away from the end wall 708. The body lugs 760 are diametrically opposed and each have a substantially rectangular cross-section. The body lugs 760 extend substantially parallel to the longitudinal axis 702. The end of each body lug 760 defines a surface, shown as engagement surface 762, opposite the end wall 708. The engagement surfaces 762 are shown as flat, but in other embodiments the engagement surfaces 762 can be otherwise shaped (e.g., angled, tapered, semicircular, etc.). A pair of second protrusions, projections, or bosses, shown as deflector lugs 764, extend radially inward into the body receiving recess 724 from the inner surface 720. The deflector lugs 764 extend away from the end wall 708, however the deflector lugs 764 do not extend as far from the end wall 708 as the body lugs 760. The deflector lugs 764 are diametrically opposed and each have a substantially semicircular cross-section. The deflector lugs 764 extend substantially parallel to the longitudinal axis 702. The end of each deflector lug 764 defines a surface, shown as engagement surface 766, opposite the end wall 708. The engagement surfaces 766 are shown as flat, but in other embodiments the engagement surfaces 766 can be otherwise shaped (e.g., angled, tapered, semicircular, etc.).

A set of third protrusions, projections, or bosses, (e.g., retention protrusions), shown as retention nubs 770, extend radially inward into the body receiving recess 724 from the inner surface 720. The retention nubs 770 are substantially dome-shaped. The protective cap 700 includes four retention nubs 770, each offset 90 degrees from one another. In other embodiments, the quantity, cross-sectional shape, and location of the body lugs 760, the deflector lugs 764, and/or the retention nubs 770 can be varied.

Figure 40:
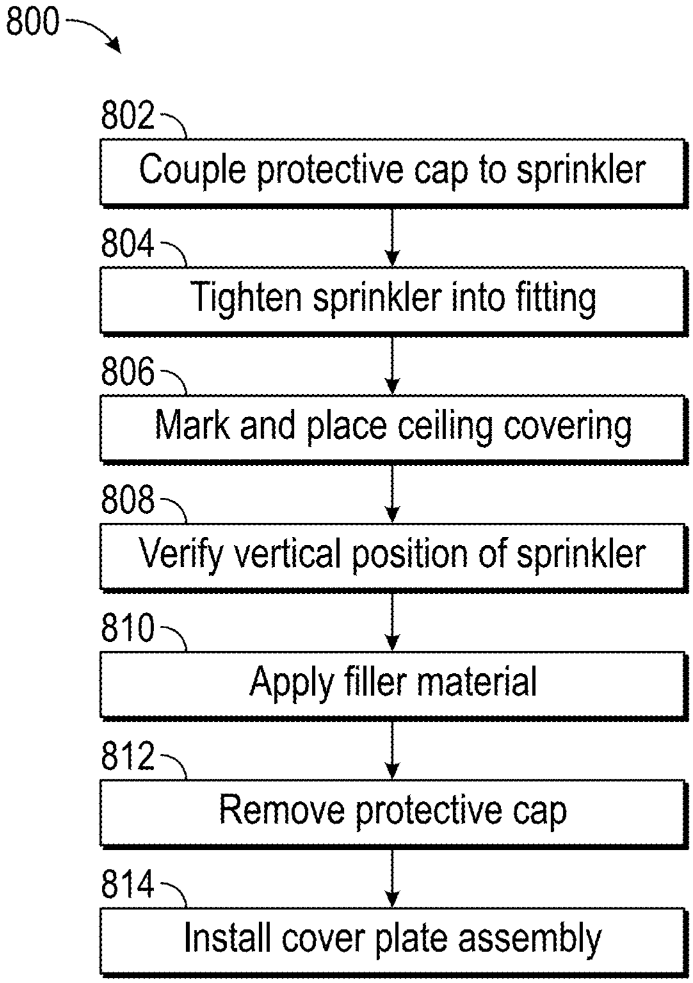
FIG. 40 is a block diagram illustrating a method of installing a sprinkler, according to an exemplary embodiment

FIG. 40 illustrates a method 800 of installing the sprinkler 100. The method 800 can be carried out immediately after the method 500 is complete. In step 802, the protective cap 700 is coupled to the sprinkler 100. The protective cap 700 is configured to receive the sprinkler 100 to protect the sprinkler 100 during installation. In some embodiments, step 802 is performed at the factory that produces the sprinkler 100 immediately after the sprinkler 100 is assembled. The protective cap 700 additionally has a number of features that facilitate the installation process of the sprinkler 100 relative to that of a conventional sprinkler. The body receiving recess 724 is configured to receive the cage portion 250 of the body 102. Accordingly, the diameter of the inner surface 720 can be slightly larger than the diameter of the cage portion 250 to facilitate insertion of the cage portion 250 into the body receiving recess 724.

To couple the sprinkler 100 with the protective cap 700, the longitudinal axis 702 is aligned with the longitudinal axis 106. The sprinkler 100 is then inserted into the body receiving recess 724. As the sprinkler 100 is inserted into the protective cap 700, the body 102 and the deflector 120 move toward the end wall 708. Eventually, the engagement surfaces 766 of the deflector lugs 764 engage the deflector plate 600 of the deflector 120, preventing further longitudinal movement of the deflector 120 toward the end wall 708. The body 102 continues to move toward the end wall 708, and the guide pins 604 slide through the apertures 620, permitting the deflector plate 600 to move closer to the body 102. Eventually, the body lugs 760 reach the outer disk 254 of the body 102. As shown in FIG. 3, the outer disk 254 and the supports 256 define a pair of recesses, reliefs, slots, grooves, or apertures, shown as lug receiving reliefs 772. The lug receiving reliefs 772 are positioned, shaped, sized, and oriented to correspond with the body lugs 760. If the body lugs 760 are aligned with the lug receiving reliefs 772, the body lugs 760 enter the lug receiving reliefs 772. If the body lugs 760 are not aligned with the lug receiving reliefs 772 (e.g., if the protective cap 700 is rotated about the longitudinal axis 702), the engagement surfaces 762 engage the outer disk 254, preventing further longitudinal movement of the body 102 toward the end wall 708. The protective cap 700 can then be rotated until the body lugs 760 align with and enter the lug receiving reliefs 772.

At some point during the insertion of the body 102 into the body receiving recess 724, the outer disk 254 engages the retention nubs 770. This can occur before, after, or at the same time as the body lugs 760 enter the lug receiving reliefs 772 depending upon the relative longitudinal positions of the retention nubs 770 and the body lugs 760. The retention nubs 770 are positioned such that they extend radially inward of the outer surface of the outer disk 254. If a threshold longitudinal force is applied to the body 102, the body 102 continues to move toward the end wall 708. Because of the dome shapes of the retention nubs 770, application of the threshold longitudinal force causes the retention nubs 770 to move radially outward (e.g., through compression of the retention nubs 770, through bending the side wall 706 outward, etc.), such that the retention nubs 770 no longer prevent longitudinal movement of the body 102. Further movement of the body 102 toward the end wall 708 places the retention nubs 770 along a side surface of the outer disk 254. In some embodiments, the retention nubs 770 and/or the main body 704 are configured to elastically deform when moving radially outward such that the retention nubs 770 press against the circumference of the outer disk 254. This produces a frictional force that opposes relative movement of the body 102 and the protective cap 700. Alternatively, the retention nubs 770 can be moved far enough along the side of the body 102 that they enter the access passage 258. In this circumstance, the retention nubs 770 are free to expand back to their free state and hold the protective cap 700 in place.

Eventually, the body 102 is inserted to a point where the sprinkler 100 and the protective cap 700 are coupled to one another, referred to hereinafter as the assembled configuration. In the assembled configuration, the protective cap 700 covers and protects the majority of the sprinkler 100 from contact with other objects. This preserves the integrity of sensitive elements within the sprinkler 100, such as the lever arms 110 and the fusible link 112. By way of example, without the protective cap 700, debris may be able to pass into the body and damage (e.g., bend, cut, etc.) the fusible link 112. This damage could potentially affect the performance of the sprinkler 100 (e.g., the temperature at which the sprinkler 100 activates, the ability of the sprinkler 100 to activate, etc.). Additionally, in the assembled configuration, the body 102 and the deflector 120 are held in place relative to the protective cap 700 with respect to both orientation and longitudinal position. This prevents wear of the sprinkler 100 prior to installation. By way of example, without the protective cap 700, the deflector 120 would be free to slide back and forth relative to the body 102 during shipping, causing wear on the body 102 and the guide pins 604.

In the assembled configuration, the body lugs 760 engage the walls of the lug receiving reliefs 772, limiting (e.g., preventing, etc.) rotation of the body 102 about the longitudinal axis 106 relative to the protective cap 700. The deflector 120 is prevented from rotating relative to the body 102 due to the shapes of the apertures 620. Contact between two or more components limits (e.g., prevents, etc.) relative longitudinal movement of the body 102, the deflector 120, and the protective cap 700. The engagement surfaces 766 of the deflector lugs 764 can engage the deflector plate 600, limiting relative longitudinal movement of the deflector 120 and the protective cap 700. The engagement surfaces 762 of the body lugs 760 can engage the walls of the lug receiving reliefs 772, limiting relative longitudinal movement of the body 102 and the protective cap 700. The outer disk 254 can engage the deflector plate 600, limiting relative longitudinal movement of the body 102 and the deflector 120. The ends of the guide pins 604 can engage the body 102 (e.g., the middle disk 252, the neck portion 240, etc.), limiting relative longitudinal movement of the body 102 and the deflector 120. One or more of the retention nubs 770 can engage the circumference of the outer disk 254, producing a frictional force that limits relative longitudinal movement of the body 102 and the protective cap 700. The retention nubs 770 can be moved far enough along the side of the body 102 that they enter the access passage 258. In this circumstance, the retention nubs 770 are free to expand back to their free state.

To remove the protective cap 700, application of the threshold force is required to again move the retention nubs 770 radially outwards.

Referring to FIGS. 3, 28-32, and 40, in step 804 of the method 800, the sprinkler 100 is coupled to the fitting 678. Specifically, the neck portion 240 of the body 102 is threaded into the fitting 678. The sprinkler 100 is then tightened to prevent leaks between the sprinkler 100 and the fitting 678. Conventionally, to tighten a sprinkler into a fitting, the protective cap is removed, and a wrench or other tool engages the sprinkler directly to apply the torque necessary to tighten it. At this point, the sprinkler is unprotected and can be easily damaged during other construction processes (e.g., when installing furniture within a room, when installing a ceiling covering, when moving ladders, etc.). The protective cap 700 is configured to facilitate tightening of the sprinkler 100 without removal of the protective cap 700, ensuring that the sprinkler 100 is protected until the very end of the installation process.

The protective cap 700 is configured to engage a tool, such as a spanner wrench, such that an operator can apply a tightening torque to the protective cap 700. Specifically, the wrench reliefs 740 are each configured to receive a protrusion from the tool. The tool can engage one or both of the wrench reliefs 740 and/or the outer surface of the main body 704. The protrusion of the tool engages the walls of the wrench relief 740, limiting relative rotation of the tool and the protective cap 700, such that a user can impart the tightening torque (e.g., through a motor, by pushing or pulling on a handle, etc.) on the protective cap 700. This tightening torque is transferred to the body 102 through engagement between the body lugs 760 and the walls of the lug receiving reliefs 772. Accordingly, the tightening torque can be imparted on the body 102 without removing the protective cap 700. The wrench reliefs 740 and the lug receiving reliefs 772 and the adjacent outer surfaces of the main body 704 and the body 102 are sized, shaped, and positioned substantially identically such that the tool that engages the wrench reliefs 740 can also engage the lug receiving reliefs 772. This facilitates tightening or loosening the sprinkler 100 with the same tool regardless of whether or not the protective cap 700 is attached to the sprinkler 100. In other embodiments, the wrench reliefs 740 and/or the lug receiving reliefs are otherwise shaped, sized, or positioned.

Figure 29:
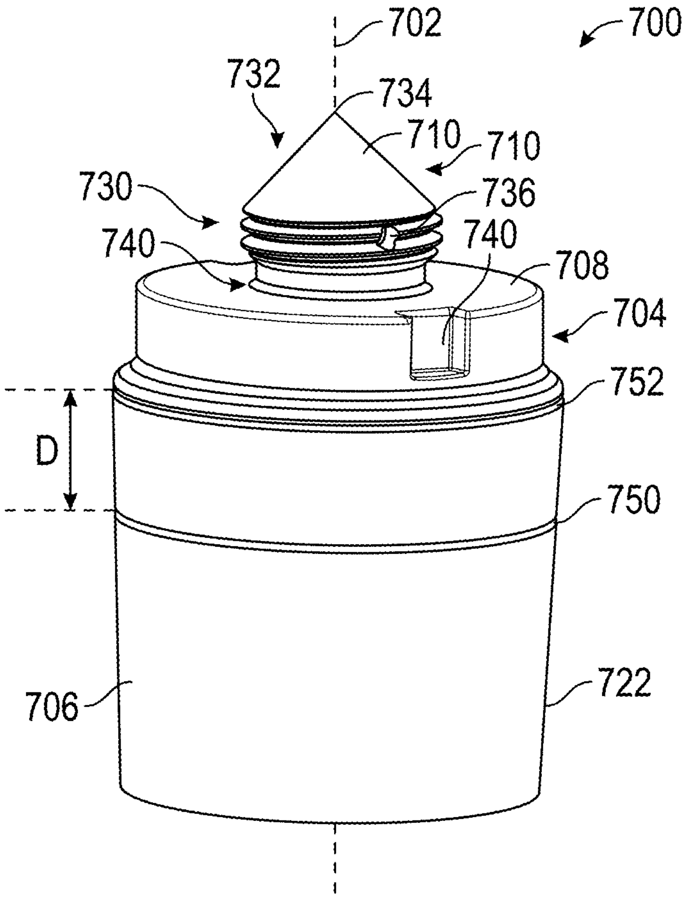
FIGS. 29-32 are perspective views of a protective cap for use with a sprinkler, according to an exemplary embodiment.
Figure 30:
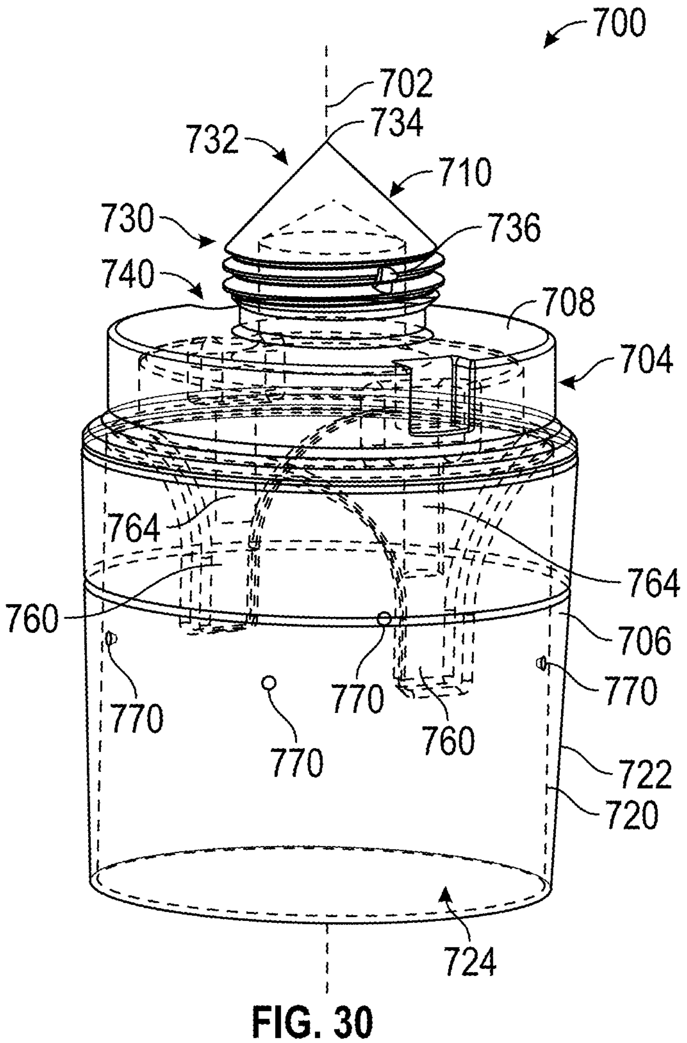
Figure 31:
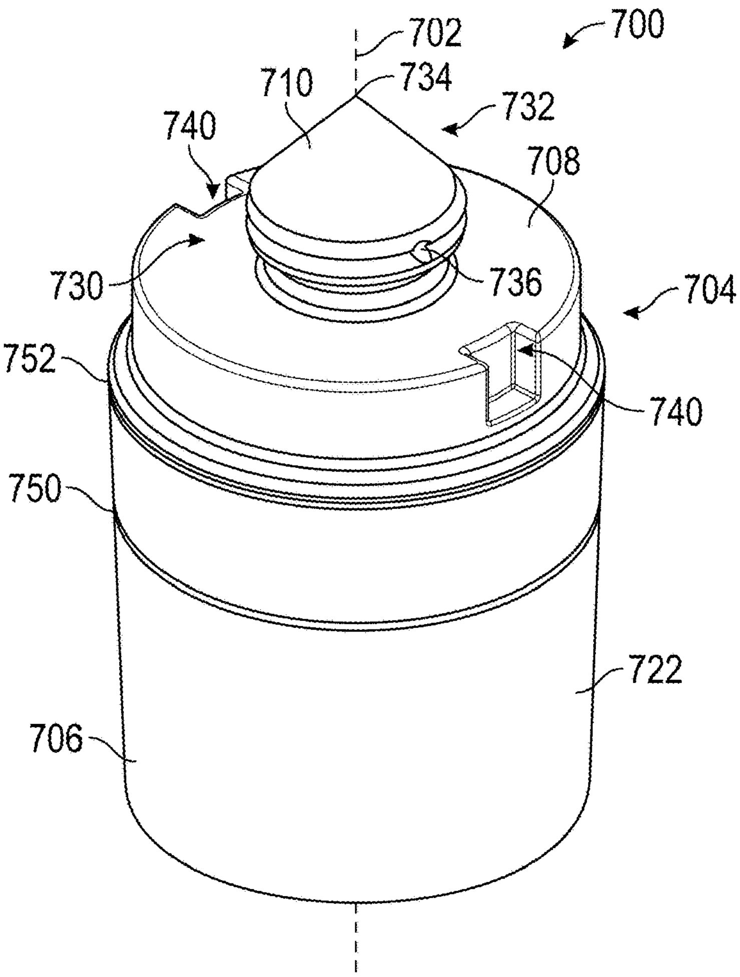
Figure 32:
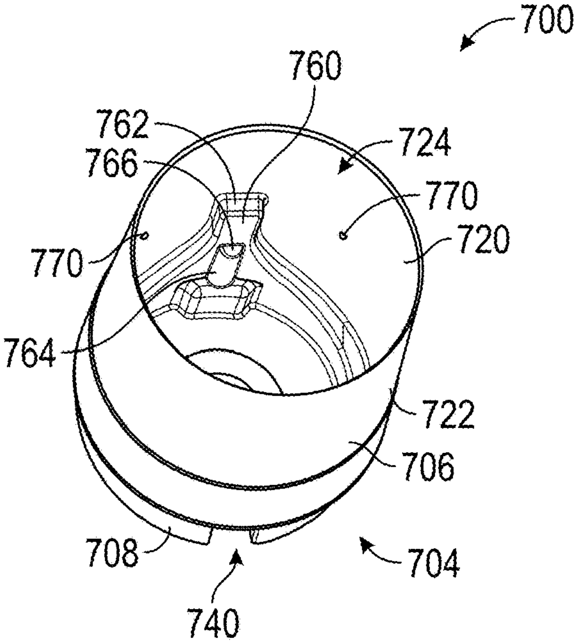
Figure 33:
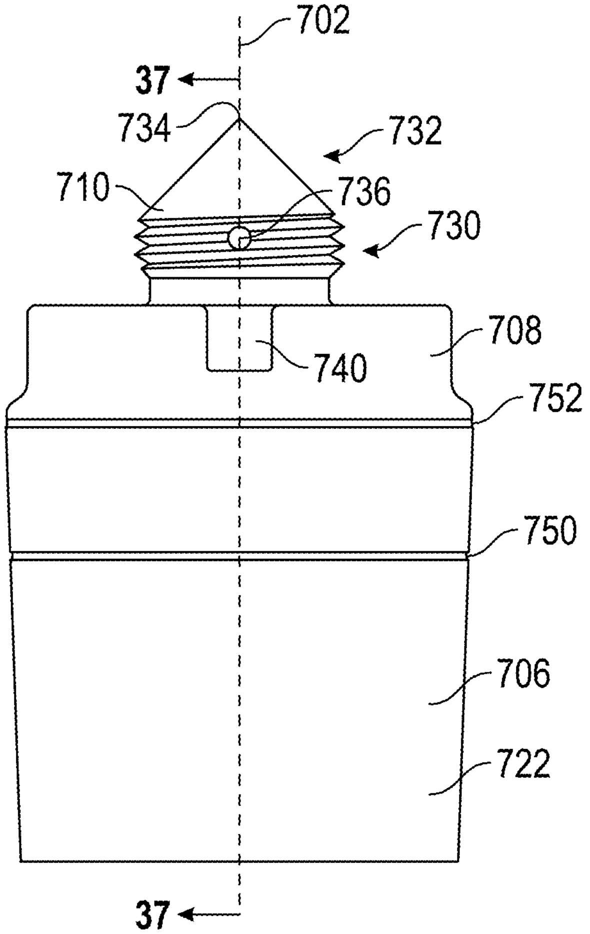
FIG. 33 is a right side view of the protective cap of FIG. 29.
Figure 34:
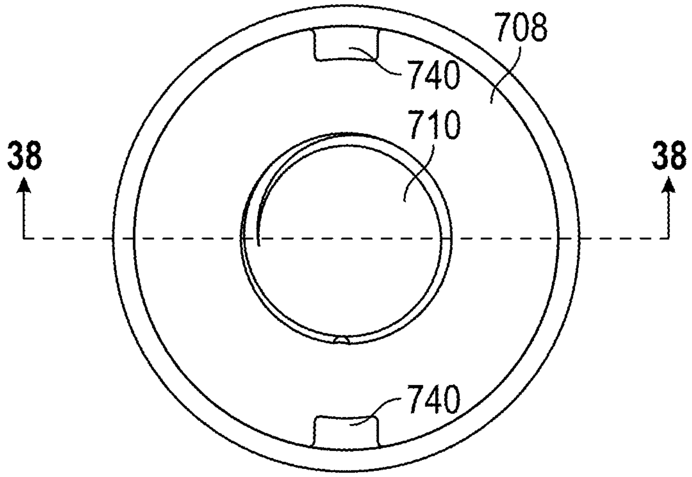
FIG. 34 is a top view of the protective cap of FIG. 29.
Figure 35:
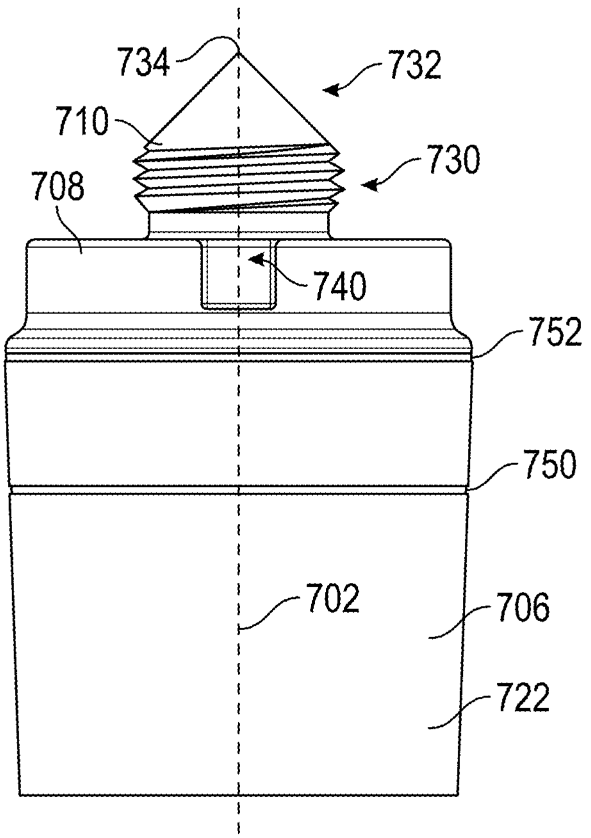
FIG. 35 is a left side view of the protective cap of FIG. 29.
Figure 36:
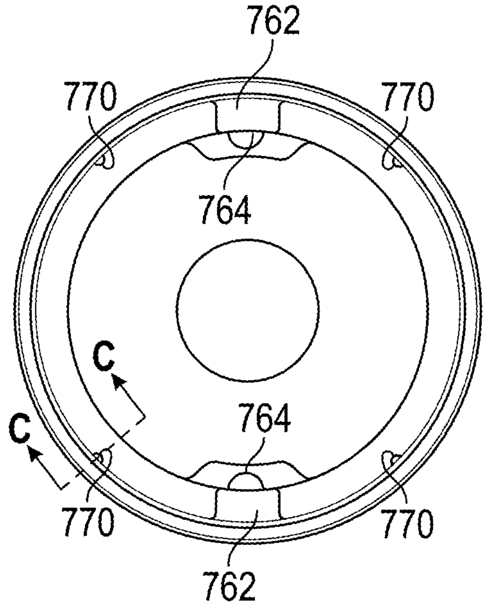
FIG. 36 is a bottom view of the protective cap of FIG. 29.

Referring to FIGS. 28, 29, and 40, in step 806 of the method 800, the ceiling covering 670 is installed. The ceiling covering 670 can be coupled to a roof structure using fasteners, adhesive, or another type of connection. The aperture 676 is cut into the ceiling covering 670 prior to coupling the ceiling covering 670 to the roof structure (e.g., using a hole saw, with a utility knife, etc.). To determine where the aperture 676 should be placed, the ceiling covering 670 can be aligned into a desired position (e.g., relative to other ceiling coverings, relative to walls, etc.), and pushed upward. The marking point 734 engages a top surface of the ceiling covering 670, leaving a mark or depression indicating the position of the longitudinal axis 702 and the longitudinal axis 106. The aperture 676 can then be cut, centering the aperture 676 on the depression left by the marking point 734. This centers the aperture 676 on the longitudinal axis 106 of the sprinkler 100. The ceiling covering 670 can then be coupled to the roof structure.

In step 808 of the method 800, the vertical position of the sprinkler 100 relative to the visible surface 680 of the ceiling covering 670 is verified. If the sprinkler 100 is installed too high, the deflector 120 will direct fire suppressant fluid onto and/or above the ceiling covering 670, reducing the area of the room 20 reached by the sprinkler 100. If the sprinkler 100 is installed too low, the cover plate assembly 650 will be prevented from fully seating against the visible surface 680. The maximum position groove 750 and the minimum position groove 752 represent the lowest and the highest allowable positions of the sprinkler 100 relative to the visible surface 680, respectively. Accordingly, the distance D represents the allowable vertical position range of the sprinkler 100. If the visible surface 680 is vertically in line with or between the maximum position groove 750 and the minimum position groove 752, then the sprinkler 100 has been installed in an acceptable vertical position. If the visible surface 680 is above the maximum position groove 750 or below the minimum position groove 752, then the installation of the sprinkler 100 should be modified (e.g., the sprinkler 100 or the ceiling covering 670 should be raised or lowered, etc.). Because the maximum position groove 750 and the minimum position groove 752 extend around the entire circumference of the protective cap 700, the vertical position of the sprinkler 100 can be verified visually from any direction except directly below the sprinkler 100. In an alternative embodiment, step 808 is completed before step 806. By way of example, the distances between the maximum position groove 750 and the minimum position groove 752 and another object having a known position relative to the visible surface 680 (e.g., the floor, the roof structure, etc.) can be measured prior to installing the ceiling covering 670.

In step 810 of the method 800, a filler material or sealing material, such as drywall mud, is added to reduce the size of spaces between the ceiling covering 670 and the sprinkler 100. The protective cap 700 is sized such that the outer surface 722 is a desired distance away from the sprinkler 100. This desired distance facilitates insertion of the cover plate assembly 650 through the aperture 676 and around the sprinkler 100. The operator can apply filler material until the filler material completely fills any spaces between the ceiling covering 670 and the outer surface 722. Because the outer surface 722 is tapered, contact between the filler material and the outer surface 722 will not prevent the protective cap 700 from being removed. In other embodiments, no filler material is added to the ceiling covering 670. Accordingly, step 810 is not performed in certain embodiments.

Referring to FIGS. 29 and 40, in step 812 of the method 800, the protective cap 700 is removed. The protective cap 700 can be removed by applying the threshold force downward on the protective cap 700 until the retention nubs 770 disengage from the body 102. In many instances, the protective cap 700 will be located high above the floor or ground, preventing the operator from pulling directly on the protective cap 700 with their hands while standing on the ground. The post 710 facilitates pulling downward on the protective cap 700 regardless of the distance between the ground and the protective cap 700. An operator can use a tool that includes a long shaft and a female threaded connector on the end of the shaft to remove the protective cap 700. The operator can use the shaft to raise the threaded connector into contact with the post 710. The operator moves the threaded connector upward, and the conical section 732 of the post 710 engages the threaded connector. This centers the threaded connector about the longitudinal axis 702. The operator can then twist the shaft such that the threaded connector threads onto the threaded section 730 of the post 710, coupling the post 710 to the tool. The operator can then pull downward on the tool to remove the protective cap 700. In some embodiments, the protective cap 700 is colored brightly (e.g., orange, etc.) or otherwise made visually distinct to facilitate visual recognition of the presence of the protective cap 700. This may help prevent an operator forgetting to remove the protective cap 700.

Figure 37:
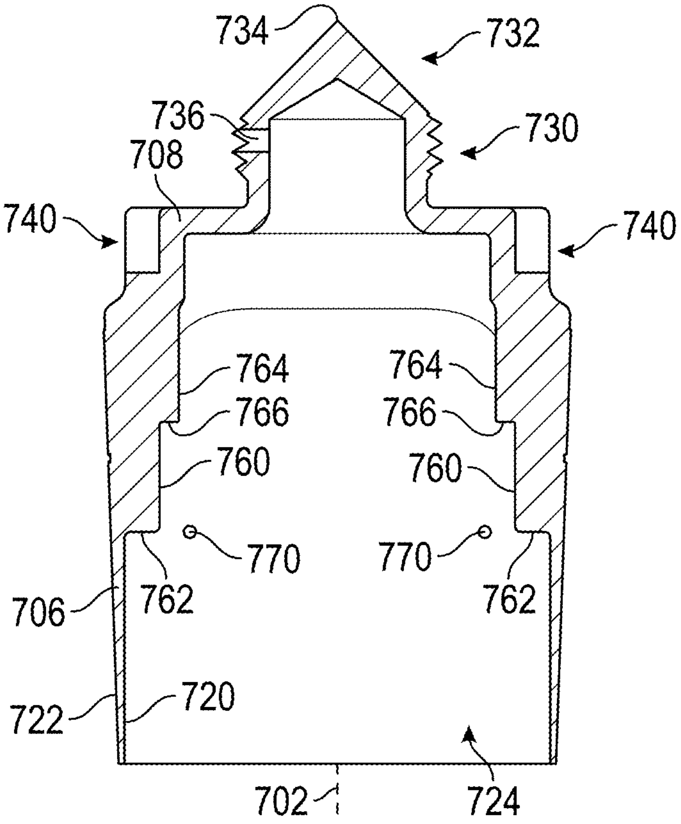
FIG. 37 is a rear section view of the protective cap of FIG. 29.
Figure 38:
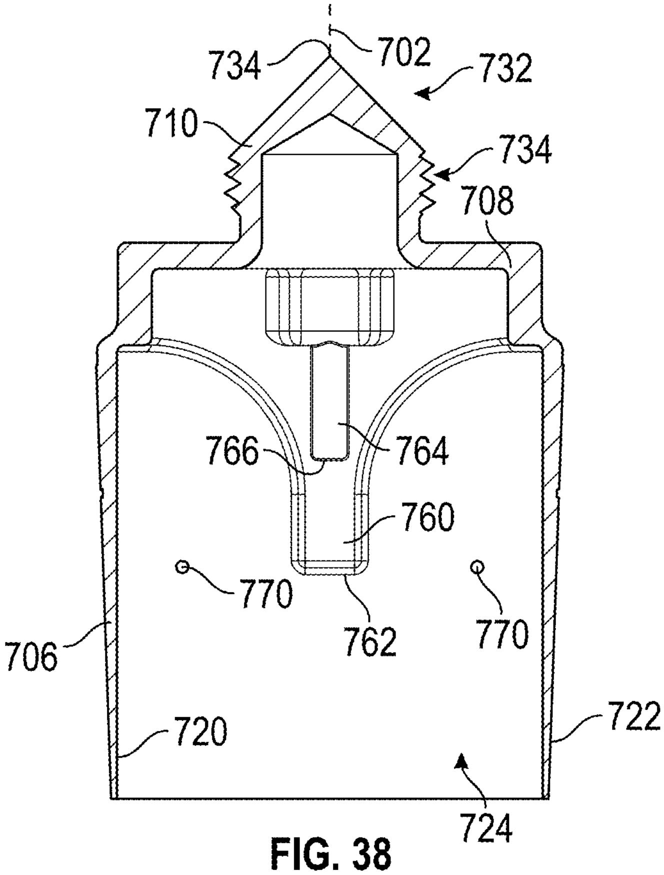
FIG. 38 is a right section view of the protective cap of FIG. 29.
Figure 39:
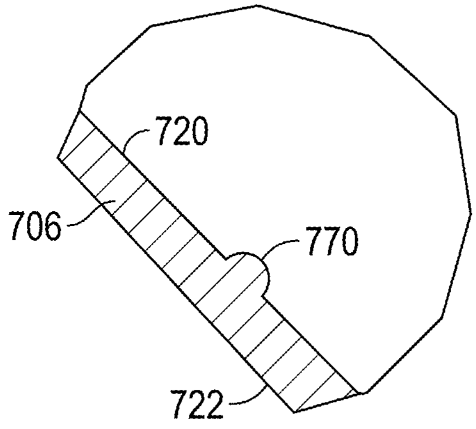
FIG. 39 is a detail section view of the protective cap of FIG. 29.

At any point after step 804, the operator can supply fire suppressant fluid to the sprinkler 100 (e.g., by opening a valve, by turning on a pump, etc.) and check for leaks. If the sprinkler 100 is leaking, the leaked fire suppressant fluid flows into the body receiving recess 724. The fluid then flows out through the weep hole 736 and drips onto the ground where it is visible to an operator. As shown in FIG. 37, the weep hole 736 is positioned near the bottom of the body receiving recess 724 when the protective cap 700 and the sprinkler 100 are installed. Accordingly, only a very small amount of the fire suppressant fluid is required to leak before the dripping fluid is visible. After the protective cap 700 is removed and the operator is satisfied that the sprinkler 100 is not leaking, in step 814 of the method 800, the cover plate assembly 650 can be installed.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Additionally, any element disclosed in one embodiment may be incorporated or utilized with any other embodiment disclosed herein. For example, the protective cap 700 of the exemplary embodiment shown in at least FIG. 29 may be used with the sprinkler 100 of the exemplary embodiment shown in at least FIG. 16. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sprinkler assembly, comprising:

a sprinkler, comprising:

a body comprising an inlet, a cylindrical cage forming an outlet, and a body relief proximate the outlet relative to the inlet, the cylindrical cage forming an access passage through the cylindrical cage, the access passage is perpendicular to a longitudinal axis that extends between the inlet and the outlet, the body relief comprising a pair of first cage walls extending inward from the cylindrical cage and a second cage wall between the pair of first cage walls;

an activation assembly coupled with the body, the cylindrical cage around the activation assembly; and a deflector coupled with the body; and a cap, comprising:

an annular wall comprising an outer surface, a first end forming an opening to receive the sprinkler, and an inner surface opposite the outer surface and extending from the first end, the inner surface forming a lug to engage the body relief;

an end wall coupled with a second end of the annular wall, the second end opposite the first end; and a plurality of reliefs, each relief of the plurality of reliefs comprising a pair of first relief walls extending inward from the outer surface and from the end wall, and a second relief wall between the pair of first relief walls.

2. The sprinkler assembly of claim 1, comprising:

the body including a passage extending along a longitudinal axis from the inlet to the outlet, the outlet between the inlet and the deflector.

3. The sprinkler assembly of claim 1, comprising:

a post extending from the end wall on an opposite side of the end wall from the annular wall.

4. The sprinkler assembly of claim 1, comprising:

a pair of guide pins slidingly coupling the deflector with the body.

5. The sprinkler assembly of claim 1, comprising:

the inner surface extending parallel with a longitudinal axis of the annular wall and the outer surface tapering relative to the longitudinal axis.

6. The sprinkler assembly of claim 1, comprising:

the plurality of reliefs extending along the end wall and the annular wall.

7. The sprinkler assembly of claim 1, comprising:

the outer surface defining a groove.

8. The sprinkler assembly of claim 1, comprising:

the end wall having a lesser diameter than the first end of the annular wall.

9. The sprinkler assembly of claim 1, comprising:

a seal coupled with the outlet, the cylindrical cage is around the seal; and the activation assembly comprises:

a pair of lever arms coupled with the seal; and a fusible link coupled with the pair of lever arms.

10. A sprinkler assembly, comprising:

a sprinkler comprising a body having a passage extending from an inlet to an outlet, a cylindrical cage around the passage, and a body relief on an exterior of the body proximate the outlet relative to the inlet, the cylindrical cage forming an access passage through the cylindrical cage, the access passage is perpendicular to a longitudinal axis that extends between the inlet and the outlet, the body relief comprising a pair of first cage walls extending inward from the cylindrical cage and a second cage wall between the pair of first cage walls, the sprinkler comprising an activation assembly coupled with the body, the cylindrical cage around the activation assembly; and a cap, comprising:

an annular wall comprising an outer surface, a first end forming an opening and a second end opposite the first end, and in inner surface between the first end and the second end, the inner surface forming a lug to engage the body relief;

an end wall coupled with the second end of the annular wall; and a plurality of reliefs on the end wall and extending inward from the outer surface, each relief of the plurality of reliefs comprising a pair of first relief walls each extending inward from the outer surface and from the end wall, and a second relief wall between the pair of first relief walls.

11. The sprinkler assembly of claim 10, comprising:

the body including a deflector coupled with the body, the outlet between the inlet and the deflector.

12. The sprinkler assembly of claim 10, comprising:

a post extending from the end wall on an opposite side of the end wall from the annular wall.

13. The sprinkler assembly of claim 10, comprising:

a pair of guide pins slidingly coupling a deflector with the body.

14. The sprinkler assembly of claim 10, comprising:

the inner surface extending parallel with a longitudinal axis of the annular wall and the outer surface tapering relative to the longitudinal axis.

15. The sprinkler assembly of claim 10, comprising:

the plurality of reliefs extending along the end wall and the annular wall.

16. The sprinkler assembly of claim 10, comprising:

the outer surface defining a groove.

17. The sprinkler assembly of claim 10, comprising:

the end wall having a lesser diameter than the first end of the annular wall.

18. The sprinkler assembly of claim 10, comprising:

a seal coupled with the outlet, the cylindrical cage is radially outward from the seal; and the activation assembly comprises:

a pair of lever arms coupled with the seal; and
a fusible link coupled with the pair of lever arms.

19. The sprinkler assembly of claim 1, comprising:
the deflector is distal from the access passage relative to the inlet, and the access passage is between the body relief and the inlet.

* * * * *